(12) United States Patent
Watson-Jones et al.

(10) Patent No.: US 12,204,950 B2
(45) Date of Patent: Jan. 21, 2025

(54) SYSTEM AND METHOD FOR WORKLOAD MANAGEMENT IN A DISTRIBUTED SYSTEM

(71) Applicant: Dell Products L.P., Round Rock, TX (US)

(72) Inventors: Rachel Elizabeth Watson-Jones, Austin, TX (US); Deeder Aurongzeb, Austin, TX (US); Erin Kurusz, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 514 days.

(21) Appl. No.: 17/497,917

(22) Filed: Oct. 9, 2021

(65) Prior Publication Data
US 2023/0112031 A1 Apr. 13, 2023

(51) Int. Cl.
| | | |
|---|---|---|
| *G06F 9/46* | (2006.01) | |
| *G06F 9/50* | (2006.01) | |
| *G06F 18/214* | (2023.01) | |
| *G06N 20/00* | (2019.01) | |

(52) U.S. Cl.
CPC .......... *G06F 9/5083* (2013.01); *G06F 9/5044* (2013.01); *G06F 18/214* (2023.01); *G06N 20/00* (2019.01); *G06F 2209/503* (2013.01); *G06F 2209/508* (2013.01)

(58) Field of Classification Search
CPC .... G06F 9/5083; G06F 18/214; G06F 9/5044; G06F 2209/503; G06F 2209/508; G06N 20/00
USPC ......................................................... 718/105
See application file for complete search history.

(56) References Cited

U.S. PATENT DOCUMENTS

| | | | |
|---|---|---|---|
| 9,928,092 B1 * | 3/2018 | Pagl | G06F 9/45558 |
| 10,057,122 B1 * | 8/2018 | Andersen | G06F 9/45558 |
| 11,113,120 B1 * | 9/2021 | Greenfield | G06F 9/4881 |
| 2006/0010101 A1 * | 1/2006 | Suzuki | G06F 11/3409 |

(Continued)

FOREIGN PATENT DOCUMENTS

CN 106713375 A * 5/2017

OTHER PUBLICATIONS

Li-jie Jin, Load balancing in Distributed system, Jan. 2, 2001, SAC, ACM 1-58113-287-5 (Year: 2001).*

(Continued)

*Primary Examiner* — April Y Blair
*Assistant Examiner* — Ross Michael Vincent
(74) *Attorney, Agent, or Firm* — Womble Bond Dickinson (US) LLP

(57) ABSTRACT

Methods and systems for managing workloads in a distributed computing environment are disclosed. The distributed computing environment may include dedicated infrastructure for performing the workloads and on-demand infrastructure that may be used to perform the workloads with attached increment cost for performance of workloads. It may be preferable to host the workloads with the dedicated infrastructure. However, the dedicated infrastructure may not always have sufficient computing resources to host all of the workloads that are to be performed over time. The disclosed methods and system may provide for workload management by automating workload instantiation, migration, and resource expansion of dedicated infrastructure.

20 Claims, 17 Drawing Sheets

(56) References Cited

U.S. PATENT DOCUMENTS

| | | | | |
|---|---|---|---|---|
| 2006/0069621 | A1* | 3/2006 | Chang | G06Q 30/0601 |
| | | | | 705/26.1 |
| 2010/0005473 | A1* | 1/2010 | Blanding | G06F 9/5044 |
| | | | | 718/104 |
| 2010/0043004 | A1* | 2/2010 | Tambi | G06F 9/485 |
| | | | | 718/103 |
| 2014/0164598 | A1* | 6/2014 | Srinivasan | H04L 41/0213 |
| | | | | 709/224 |
| 2014/0244846 | A1* | 8/2014 | Takehara | H04L 47/83 |
| | | | | 709/226 |
| 2015/0149618 | A1* | 5/2015 | Kodali | H04L 47/83 |
| | | | | 709/224 |
| 2015/0304195 | A1* | 10/2015 | Bhargav-Spantzel | |
| | | | | H04L 43/10 |
| | | | | 709/224 |
| 2017/0091107 | A1* | 3/2017 | Peterson | G06F 12/084 |
| 2017/0235613 | A1* | 8/2017 | Smola | G06F 9/5077 |
| | | | | 718/1 |
| 2018/0287955 | A1* | 10/2018 | Fitzgerald | H04L 41/0896 |
| 2019/0087213 | A1* | 3/2019 | Matters | G06F 9/45558 |
| 2020/0133702 | A1* | 4/2020 | Sharma | G06F 9/5088 |
| 2020/0233712 | A1* | 7/2020 | Meng | G06F 9/5011 |
| 2021/0011764 | A1* | 1/2021 | Kelly | G06F 9/505 |
| 2022/0070225 | A1* | 3/2022 | Drori | H04L 69/28 |
| 2022/0091903 | A1* | 3/2022 | Bai | G06F 8/60 |
| 2022/0129316 | A1* | 4/2022 | Sheoran | G06F 9/5083 |
| 2022/0138013 | A1* | 5/2022 | Khatri | G06F 9/505 |
| | | | | 718/104 |
| 2022/0326994 | A1* | 10/2022 | Mueller | G06F 21/6218 |
| 2022/0405149 | A1* | 12/2022 | Gross | G06F 9/5066 |
| 2022/0414577 | A1* | 12/2022 | Patel | G06Q 10/06312 |
| 2023/0061641 | A1* | 3/2023 | Stringer | G06F 9/5011 |
| 2023/0376344 | A1* | 11/2023 | Jutzi | G06F 9/45558 |

OTHER PUBLICATIONS

Mohamed Yassine Samiri, Self-adaptive workflow management system using prediction model, Dec. 9, 2016, King Fahd University of Petroleum & Minerals 2016, DOI 10.1007/s13369-016-2372-3 (Year: 2017).*

* cited by examiner

SYSTEM AND METHOD FOR WORKLOAD MANAGEMENT IN A DISTRIBUTED SYSTEM

FIELD

Embodiments disclosed herein relate generally to workload management. More particularly, embodiments disclosed herein relate to systems and methods for distributed management of workloads in computing environments.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation and quantities of these components may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
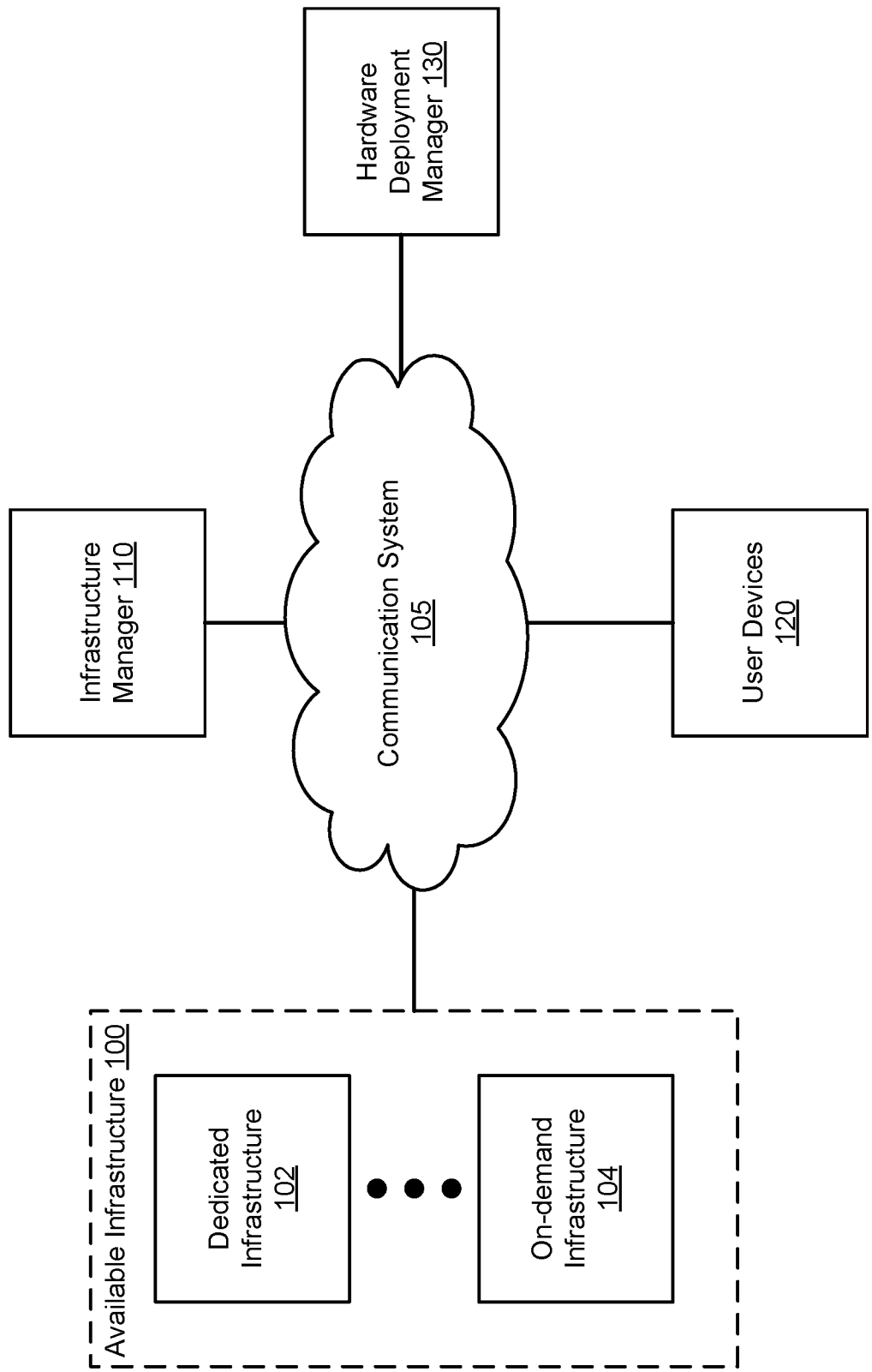
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing workloads in a distributed computing environment. The distributed computing environment may include dedicated infrastructure for performing the workloads and on-demand infrastructure that may be used to perform the workloads with attached increment cost for performance of workloads. For example, the dedicated infrastructure may be implemented with on-premises infrastructure while the on-demand infrastructure may be implemented with a public cloud or other general computational service provider.

Generally, it may be preferable to host the workloads with the dedicated infrastructure (e.g., due to cost, security, regulatory, and/or other concerns). However, the dedicated infrastructure may not always have sufficient computing resources to host all of the workloads that are to be performed over time (e.g., at least to an extent that the dedicated infrastructure is not able to meet all of the corresponding goals for the workloads such as, for example, timeliness, performance levels, etc.).

To manage workloads in the distributed computing environment (e.g., available infrastructure), a system in accordance with embodiments disclosed herein may manage the workloads in a distributed manner. To do so, one or more policies may be implemented and used to manage, for example, workload instantiation location decision making, workload migration decision making (e.g., between dedicated and/or on-demand infrastructure), hardware acquisition and deployment decision making, and/or other decision making process with respect to workload management. The policies may include one or more conditional actions that are automatically performed upon the occurrence of one or more conditions. The one or more conditions may be based, at least in part, on the predicted future operation of the dedicated infrastructure of the computing environment.

For example, the policies may include actions that are to be automatically performed when, for example, the available computing resources of dedicated infrastructure are predicted to fall below a threshold during a future period of time. Prior to (and/or during) the future period of time, the actions corresponding to the condition may be automatically performed. The actions may be tailored to mitigate the impact of the future conditions that are predicted to occur in the future. The actions may include, for example, automatically migrating one or more workloads from dedicated infrastructure to on-demand infrastructure, requisitioning additional hardware for the dedicated infrastructure, and/or putting in place a future migration plan to repatriate previously migrated workloads back to the dedicated infrastructure. In this manner, future period of time where computing resources of the dedicated infrastructure may be insufficient to complete workloads may be mitigated by automatically migrating some workloads (e.g., to reduce the likelihood of the insufficient computing resource condition occurring) while also automatically requisitioning and installing additional hardware in the dedicated infrastructure to reduce the likelihood of such insufficient computing resource conditions from occurring (or being predicted to occur) in the future.

To generate predictions regarding the future workload capacity of the dedicated infrastructure, recent workload trends may be used to predict future workload expectations. The future workload expectations in combination with samples of the computational cost of performing such workloads may be used to predict the quantities of computing resources of the dedicated infrastructure that are likely to be available (and unavailable) in the future.

Using the disclosed systems and methods, a distributed approach to workload management may be provided in an embodiment. The distributed approach to workload management may allow any number of persons to request the performance of workloads. The requests may be used, in combination with the predictions, to automatically manage the performance of workloads across both dedicated and on-demand infrastructure.

In an embodiment, a computer-implemented method for managing infrastructure comprising dedicated infrastructure and on-demand infrastructure is provided. The method may include obtaining, with an interface presented to a user, a workload performance request for a workload of workloads to be performed during a future period of time; obtaining a policy associated with the workload; obtaining a resource availability estimate for the dedicated infrastructure during the future period of time; making a determination, based at least in part on the resource availability estimate and the policy, regarding whether the dedicated infrastructure will have sufficient available resources during the future period of time to perform the workloads; when the determination indicates that the dedicated infrastructure will have sufficient available resources during the future period of time, hosting the workloads with the dedicated infrastructure during the future period of time; and when the determination indicates that the dedicated infrastructure will not have sufficient available resources, performing at least one action specified by the policy to use the on-demand infrastructure to host a portion of the workloads during the future period of time, increase a quantity of resources of the dedicated infrastructure, and manage the portion of the workloads after the quantity of the resources of the dedicated infrastructure is increased.

The policy may be a multivariate policy including at least two variables that define when the at least one action is to be performed.

The policy may specify a dedicated infrastructure available resource threshold compared to the resource availability estimate while making the determination; and the at least one action including an action selected from a group of actions consisting of: expanding a capacity of the dedicated infrastructure, migrating a workload of workloads hosted by the dedicated infrastructure to the on-demand infrastructure, notifying a second user of a limited capacity of the dedicated infrastructure, establishing a condition of the dedicated infrastructure triggering migration of the workload from the on-demand infrastructure to the dedicated infrastructure, and notifying a third user of migration of the workload from the on-demand infrastructure to the dedicated infrastructure.

The policy may also specify a cost threshold associated with the workload, the cost threshold defining a maximum acceptable cost for hosting the workload during the future period of time, the cost for hosting the workload being dependent on whether the workload is hosted by the dedicated infrastructure or the on-demand infrastructure.

The policy may also specify a relative ranking of the workload with respect to the other workloads, the relative ranking indicating whether the workload or whether another workload is preferred for hosting by the on-demand infrastructure.

The policy may also specify a security restriction, the security restriction defining a limit on hosting of the workload by the on-demand infrastructure, the security restriction specifying one limitation from a group of limitations consisting of: a maximum duration of time of hosting by the on-demand infrastructure, a hardware requirement of the on-demand infrastructure that must be met for the workload to be hosted by the on-demand infrastructure, and a software requirement of the on-demand infrastructure that must be met for the workload to be hosted by the on-demand infrastructure.

Managing the portion of the workloads after the quantity of the resources of the dedicated infrastructure is increased may include migrating at least one workload of the portion of the workloads based on at least one policy corresponding to the at least one workload.

Obtaining the resource availability estimate for the dedicated infrastructure during the future period of time may include monitoring, during a second period of time previous to the future period of time, use of computational resources of the dedicated infrastructure to establish an available computing resources over time trend for the dedicated infrastructure; generating, based on the available computing resources over time trend, an inference model for the dedicated infrastructure; and generating the resource availability estimate using the inference model.

The inference model may be obtained by fitting a curve to the available computing resource over time trend, the inference model predicting future processing resources of the dedicated infrastructure available for performing the workloads during the future period of time.

The inference model may be further obtained by fitting a second curve to a portion of the computing resource over time trend associated with storage resources of the dedicated infrastructure, the inference model also predicting future storage resources of the dedicated infrastructure available for performing the workloads during the future period of time, the resource availability estimate specifying both the processing resources and the storage resources of the dedicated infrastructure available for performing the workloads during the future period of time.

Making the determination may include identifying a quantity of processing resources for performing the workloads; identifying a quantity of storage resources for performing the workloads; comparing the identified quantity of processing resources to the processing resources specified by the resource availability estimate to obtain a first indicator; comparing the identified quantity of storage resources to the storage resources specified by the resource availability estimate to obtain a second indicator; and using the first indicator and the second indicator in the determination.

The use of computational resources of the dedicated infrastructure may be monitored by, during the second period of time: sampling resources consumption for performance of a subset of the workloads to obtain workload samples; extrapolating the workload samples to obtain an estimate of resource consumption for performance of the workloads to obtain a consumption estimate for the second period of time; and calculating the available computing resources over time trend using the consumption estimate.

The inference model may be obtained by training a machine learning model using historical computing resource availabilities of the dedicated infrastructure and historical new workload instantiations in the infrastructure.

The policy may be obtained by: presenting a policy creation interface to an administrator; receiving, via the policy creation interface, input from the administrator; and storing a new policy in a policy repository based on the input from the administrator, the new policy being associated with a type of the workload.

The policy may be further obtained by: identifying a type of the workload specified by the workload performance request; matching the type of the workload specified by the workload performance request to the policy based on the association to the type of the workload; and reading the policy from the policy repository.

The policy may be further obtained by: based on the input, identifying a policy conflict with another policy; and generating the new policy based on the input and the policy conflict.

A non-transitory media may include instructions that when executed by a processor cause the computer-implemented method to be performed.

An infrastructure manager may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide for the management of available infrastructure 100. Available infrastructure 100 may be capable of performing any number of workloads. The workloads may be performed based on requests from user of user devices 120.

Performing the workloads may cause computer implemented services to be provided by available infrastructure 100. The computer implemented services may include, for example, data storage services, electronic communication services, database services, audio/visual distribution services, Internet services (e.g., serving web pages, providing backend functionality, etc.), and/or any number and types of computer implemented services. Available infrastructure 100 may provide other types of computer implemented services without departing from embodiments disclosed herein. The computer implemented services may be provided to, for example, various components of available infrastructure 100, various user devices 120, devices (not shown) of other persons.

Performing the workloads may consume computing resources. Computing resources may include, for example, processing resources (e.g., processor cycles for computations provided by central processing units, cores of processors, etc.), persistent storage resources (e.g., data storage capacity provided by hard disk drives, solid state drives, etc.), transitory storage resources (e.g., data storage capacity provided by random access memory, persistent random access memory, etc.), communications resources (e.g., communications unit sending and/or receiving capacity provided by network interface cards, etc.), and/or other types of computing resources (e.g., graphics processing, process acceleration, etc. provided by graphics processing units, hardware accelerators, etc.).

To perform workloads, available infrastructure 100 may include dedicated infrastructure 102 and on-demand infrastructure 104. Dedicated infrastructure 102 may include infrastructure that is dedicated for performing the workloads. However, dedicated infrastructure 102 may include a finite capacity for performing workloads (e.g., dedicated infrastructure 102 may only include hardware components able to provide a finite quantity of computing resources usable to perform the workloads). For example, dedicated infrastructure 102 may be implemented with a limited number of computing devices that each are only able to perform a number of actions per unit time usable to complete the workloads. Thus, dedicated infrastructure 102 may not be capable of performing all of the workloads when the workloads to be performed include more actions than can be performed by dedicated infrastructure 102.

To improve the likelihood of workloads being completed and/or performed within time limits and/or meeting other goals for the workloads, available infrastructure 100 may also include on-demand infrastructure 104. On-demand infrastructure may be capable of performing any number of workloads and may generally have access to a far greater quantity of computing resources for performing workloads. In contrast to dedicated infrastructure 102, on-demand infrastructure 104 may not be dedicated for the performance of particular workloads (e.g., those requested to be performed by users of user devices 120). Rather, the computing devices of on-demand infrastructure 104 may be available for use by any number of users for the performance of any number and types of workloads.

For example, dedicated infrastructure 102 may be implemented with on-premises or private computing device deployments while on-demand infrastructure 104 may be implemented with public infrastructure such as a public cloud available for general use, albeit with incremental cost associated with its use. Both dedicated infrastructure 102 and on-demand infrastructure 104 may be available for the performance of workloads for a group of users, such as, for example, employees of an organization while dedicated infrastructure 102 may only be available for the performance of workloads for the users of user devices 120.

However, while both dedicated infrastructure 102 and on-demand infrastructure 104 may be available for performing workloads for the group of users, dedicated infrastructure 102 may be preferentially selected for use over on-demand infrastructure 104. However, because dedicated infrastructure 102 may not always be a capable of servicing all of the workloads for the group of users, on-demand infrastructure 104 may also need to be used for completion of the workloads for the group of users to ensure that corresponding goals for the workloads are met (e.g., completion target, rate of performance, etc.).

In general, embodiments disclosed herein provide for the management of available infrastructure 100 including dedicated infrastructure 102 and on-demand infrastructure 104. A system, in accordance with an embodiment disclosed herein, may provide a cooperative manner of managing available infrastructure 100 to meet the workload needs of the users of user devices 120.

To cooperatively manage available infrastructure 100, a system in accordance with an embodiment may include infrastructure manager 110. Infrastructure manager 110 may provide infrastructure management services. Infrastructure management services may include (i) obtaining policies that specify restrictions, goals, and/or other information for workloads for users (e.g., a predetermined group such as employees of a company, member of an organization, etc.), (ii) obtaining workload requests for workloads from the users, (iii) generating future capacity estimates for dedicated infrastructure 102, (iv) instantiating workloads in dedicated infrastructure 102 and/or on-demand infrastructure 104 based on the policies and future capacity estimates, (v) managing a process of automatically increasing the computing resources of dedicated infrastructure 102 when one or more workloads are instantiated on on-demand infrastructure 104, and (vi) migrating the one or more workloads from the on-demand infrastructure to dedicated infrastructure 102 after its computing resources are automatically increased.

By doing so, a distributed process of managing workloads may be provided. The distributed process may not rely on administrators or other managers to determine where to instantiate various workloads, and when to modify the computing resources of dedicated infrastructure 102, and when (or if) certain workloads are migrated between dedicated infrastructure 102 and on-demand infrastructure 104. Consequently, a workload management process in accordance with an embodiment disclosed here may provide an improved user experience by (i) responding more quickly to workload performance requests, (ii) automatically ensuring that multidimensional considerations for where to instantiate workloads are taken into account when instantiating workloads, (iii) reduce a cognitive burden on users that desire workload to be performed by removing the workload instantiation location decision making processes from the users, (iv) improving user engagement by reducing barriers to workload performance (e.g., such as contacting or working with administrators to instantiate workloads), and/or (v) enable organizations to meet various regulatory, cost (e.g., new hardware spend, on-demand infrastructure use spend, etc.), and other considerations with appropriate workload placement through automated workload management policy implementations.

When providing the workload management services, to obtain the workload requests, infrastructure manager 110 may receive the requests from user devices 120, which may display interfaces to respective users and through which allow users to provide the workload requests to infrastructure manager 110. The interfaces may allow the users to provide goals, expectations, and/or other information regarding the workloads. The interfaces may also automatically allow for a requested workload to be categorized into a type. For example, the interfaces may present a user with a range of different workload types and allow the user to select a workload type. The type for each workload may be obtained via other methods (e.g., with pattern matching based on content of the workload requests to a variety of types for various workloads, with each type being associated with characteristics that may be pattern matched to when obtaining a type for a workload).

To automatically increase computing resources of dedicated infrastructure 102 (e.g., thereby reducing the likelihood that compromises in past workload instantiation decisions continue to be made into the future), infrastructure manager 110 may send requisition requests to hardware deployment manager 130. Hardware deployment manager 130 may be implemented with a platform of a hardware vendor that may send various hardware components for installation in dedicated infrastructure 102 in response to requisition requests from infrastructure manager 110. Infrastructure manager 110 may automatically track the hardware of dedicated infrastructure 102 to identify when new hardware is added to dedicated infrastructure 102 thereby changing the capacity of dedicated infrastructure 102 for workload performance.

To generate future capacity estimates for dedicated infrastructure 102, infrastructure manager 110 may take into account historic trends in workload instantiation. The historic trends may be used to obtain inference models used to generate the future capacity predictions. Infrastructure manager 110 may use the future capacity estimates (and corresponding policies for the workloads) to determine whether to (i) migrate existing workloads between dedicate infrastructure 102 and on-demand infrastructure, (ii) requisition new hardware for dedicated infrastructure 102, and/or (iii) establish future workload migration plans to be performed after the new hardware is added to dedicated infrastructure 102.

Figure 2A:
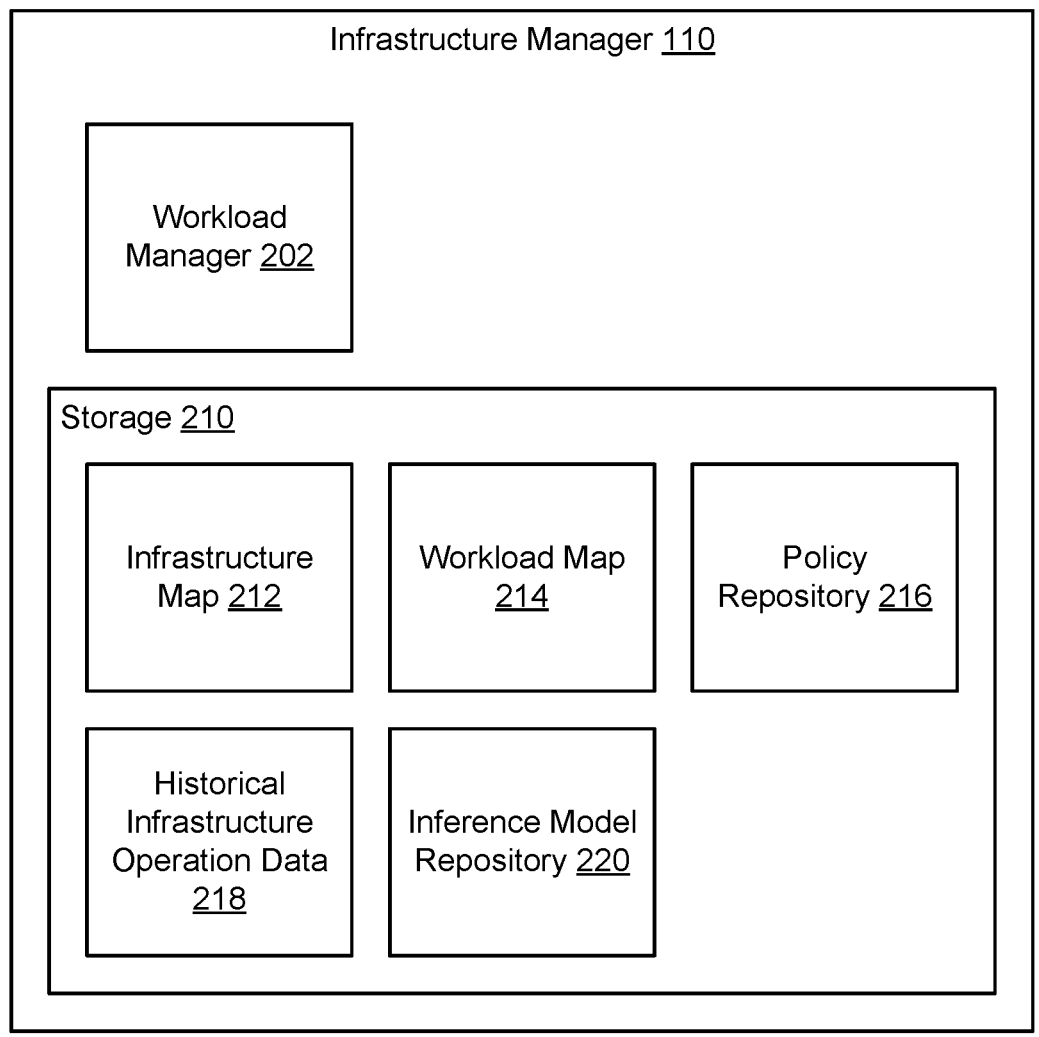
FIG. 2A shows a block diagram illustrating an infrastructure manager in accordance with an embodiment.

For additional details regarding infrastructure manager 110, refer to FIG. 2A.

User devices 120 may be used to obtain input from users and/or administrators. The input from users may allow for users to provide infrastructure manager 110 with workload requests for workloads. The workload requests may specify, for example, workloads to be performed, goals for the workloads (e.g., completion time, cost, etc.), and/or other information regarding the workloads to be performed by available infrastructure 100.

The input from administrators may allow for administrators to define policies for governing the instantiation and management of different types of workloads. The policies may specify, for example, any number of conditions and corresponding actions to be performed in response to the condition. The conditions may be based, for example, on the future capacity estimates for dedicated infrastructure 102, changes in the computing resources of dedicated infrastructure 102 (e.g., such as when additional hardware is added to dedicated infrastructure 102), and/or other information.

For example, a policy may specify that when available resources of dedicated infrastructure 102 for below a predetermined quantity, then the workload may be migrated to on-demand infrastructure for workload management purposes. The policy may further specify that when the workload is migrated to the on-demand infrastructure, then the resources of dedicated infrastructure 102 are to be increased to reduce the possibility of the workload remaining in or otherwise being instantiated on on-demand infrastructure 104 in the future. The policy may additionally specify that after the resources of dedicated infrastructure 102 are expanded, the workload on on-demand infrastructure 104 is to be migrated to the resources improved dedicated infrastructure 102.

In another example, a policy may specify that a workload may never be migrated to or instantiated on on-demand infrastructure 104, regardless of the available resources of dedicated infrastructure 102 and/or the inability to complete the workload with dedicated infrastructure 102 within a corresponding time goal. Such a policy may be made, for example, to improve the likelihood of the operation of the system of FIG. 1 complying with various regulatory requirements.

Hardware deployment manager 130 may provide hardware management services. Hardware management services may include (i) obtaining requisition requests for hardware for dedicated infrastructure 102 from infrastructure manager 110, (ii) managing the process of obtaining, transporting, and/or deploying requisitioned hardware to dedicated infrastructure 102, and/or (iii) providing information to infrastructure manager 110 regarding the cost associated with various hardware that may be requisitioned for use with dedicated infrastructure 102. Generally, infrastructure manager 110 may provide requisition requests to hardware deployment manager 130 to add hardware to dedicated infrastructure 102. Once added, infrastructure manager 110 may modify the manner in which it is managing workloads (e.g., by migrating one or more workloads from on-demand infrastructure 104 to dedicated infrastructure 102) based on the new computing resources available to dedicated infrastructure 102 after hardware is added to it.

Available infrastructure 100, infrastructure manager 110, user devices 120, and/or hardware deployment manager 130 may be implemented using a computing device such as a host or server, a personal computer (e.g., desktops, laptops, and tablets), a "thin" client, a personal digital assistant (PDA), a Web enabled appliance, or a mobile phone (e.g., Smartphone), an embedded system, local controllers, and/or any other type of data processing device or system. For additional details regarding computing devices, refer to FIG. 6.

Any of the components illustrated in FIG. 1 may be operably connected to each other (and/or other components not illustrated in FIG. 1) with a communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the internet protocol). In an embodiment, any of the components of FIG. 1 may be directly connected to other components of FIG. 1 (and/or other components not illustrated in FIG. 1) with, for example, one or more point to point connections that do not traverse through a network.

While illustrated in FIG. 1 as included a limited number of specific components, a system in accordance with an embodiment may include fewer, additional, and/or different components than those illustrated therein.

Turning to FIG. 2A, a diagram of infrastructure manager 200 in accordance with an embodiment is shown. As discussed above, infrastructure manager 110 may provide infrastructure management services by selectively instantiating workload instances, migrating workload instances between various types of infrastructure, automatically managing changes in computing resources of dedicated infrastructure 102, and/or taking action once the computing resources of dedicated infrastructure have been changed.

To provide its functionality, infrastructure manager 110 may include workload manager 202 and storage 210. Each of these components is discussed below.

Workload manager 202 may provide workload request management services. Workload request management services may include receiving workload requests, instantiating workloads in dedicated infrastructure 102 and/or on-demand infrastructure 104 to service the workload requests, and automatically modifying the computing resources of dedicated infrastructure 102 based on operational conditions of dedicated infrastructure 102. By doing so, workload manager 202 may provide for the distributed management of workload performance.

To obtain the workload requests, workload manager 202 may present interfaces to users (e.g., through client devices) that allow the users to request that workloads be performed and provide expectations with respect to the performance of the workloads (e.g., timeliness of completion or initiation of workload performance, a quality level of the performance of the workload which may be defined, for example, by a quantity of computing resources that are to be dedicated for the workload, etc.). The interfaces may be graphical user interface presented to users via displays. The interfaces may include input fields for receiving corresponding information from users for a workload performance request.

Figure 2B:
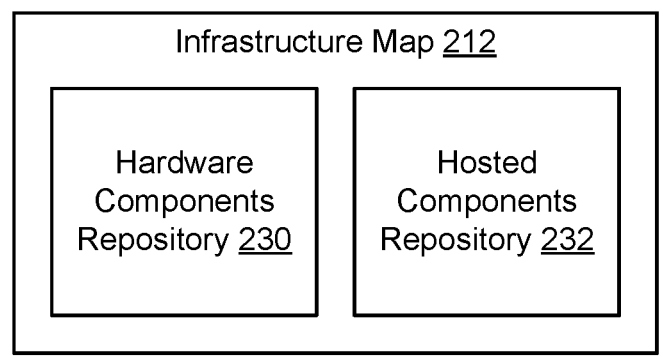
FIG. 2B shows a block diagram illustrating an infrastructure map in accordance with an embodiment.
Figure 2C:
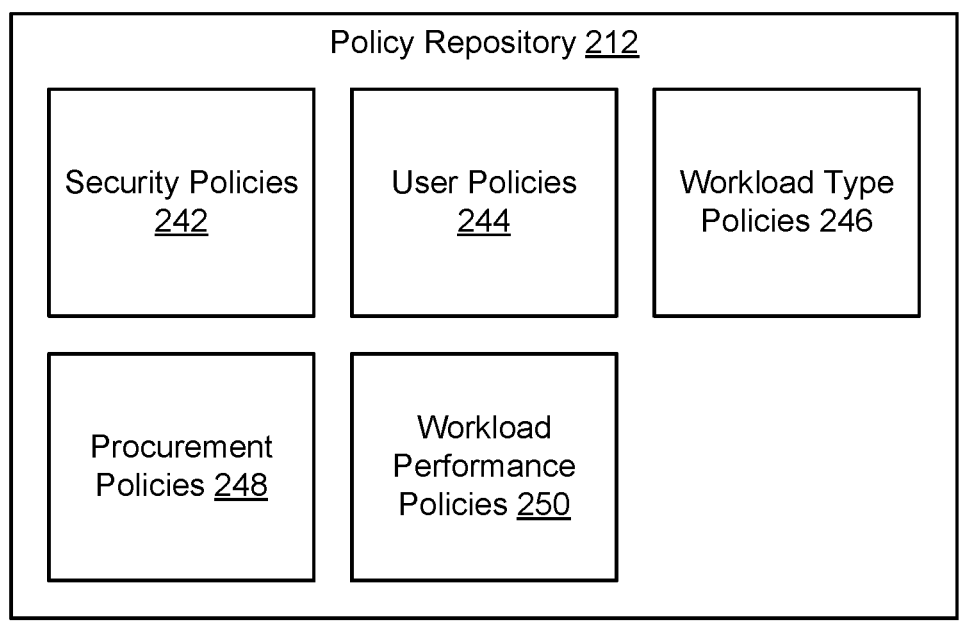
FIG. 2C shows a block diagram illustrating a policy repository in accordance with an embodiment.

To instantiate workloads corresponding to the workload requests, workload manager 202 may take into account one or more policies stored in policy repository 216. These policies may specify various conditional actions to be performed when a corresponding workload request is obtained and/or may specify various limitations regarding in which types of infrastructure various types of workloads may be instantiated. Workload manager 202 may take these restrictions into account and/or perform any of the conditional actions (presuming that corresponding conditions requisite to the actions are met) of any number of policies of policy repository 216 when a workload is instantiated. Refer to FIG. 2C for additional details regarding policy repository 216.

Additionally, to instantiate the workloads, future workload capacity predictions for dedicated infrastructure may be obtained. The future workload capacity predictions may be used, in part, to determine whether any conditional actions are to be performed (e.g., any of the conditional actions may be keyed or other may be triggered based on a prediction) and/or used to ascertain whether to migrate workloads to on-demand infrastructure (and/or instantiate new workloads in the on-demand infrastructure).

The infrastructure models may be obtained using information stored in historical infrastructure operation data 218. The inference models may be stored in inference model repository 220.

In an embodiment, historical infrastructure operation data 218 is implemented with a list of entries. Each of the entries may correspond to a workload previously and/or currently hosted by available infrastructure. Each of the entries may also specify, for example, (i) when a request for the corresponding workload was obtained/generated, (ii) the computing resources used to host the corresponding workload, and/or (iii) other types of information regarding the corresponding workloads.

Workload manager 202 may also maintain infrastructure map 212 and infrastructure map 212. Infrastructure map 212 may include information regarding the components and computing resources of dedicated infrastructure 102 and/or on-demand infrastructure 104. Workload map 214 may include information regarding workload instances hosted by dedicated infrastructure 102 and/or on-demand infrastructure 104. The information included in these maps 212, 214 may be used by workload manager 202 to, for example, obtain historical infrastructure operation data 218, make workload instantiation decisions, and/or for other purposes. Refer to FIG. 2B for additional details regarding infrastructure map 212.

In an embodiment, workload map 214 is implemented with a list of entries. Each of the entries may correspond to a workload hosted by available infrastructure. Each of the entries may also specify, for example, (i) the computing resources dedicated for the corresponding workload, (ii) an instantiation location (e.g., dedicated or on-demand infrastructure), (iii) information regarding the performance of the corresponding workload (e.g., duration of execution, expected/estimate time to completion, etc.), and/or (iv) other types of information regarding workloads hosted by available infrastructure.

Figure 3:
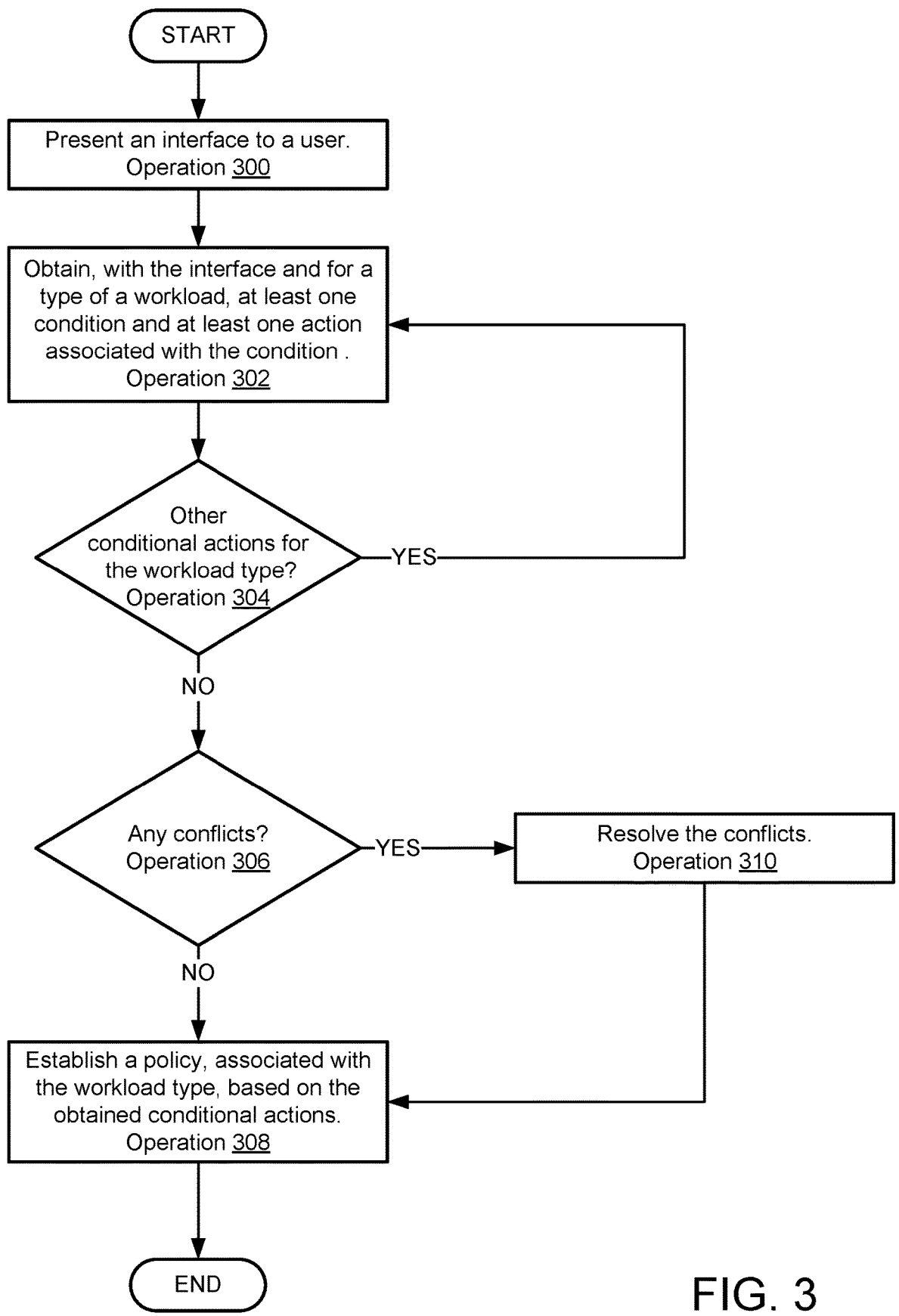
FIG. 3 shows a flow diagram illustrating a method of managing policies in accordance with an embodiment.
Figure 4A:
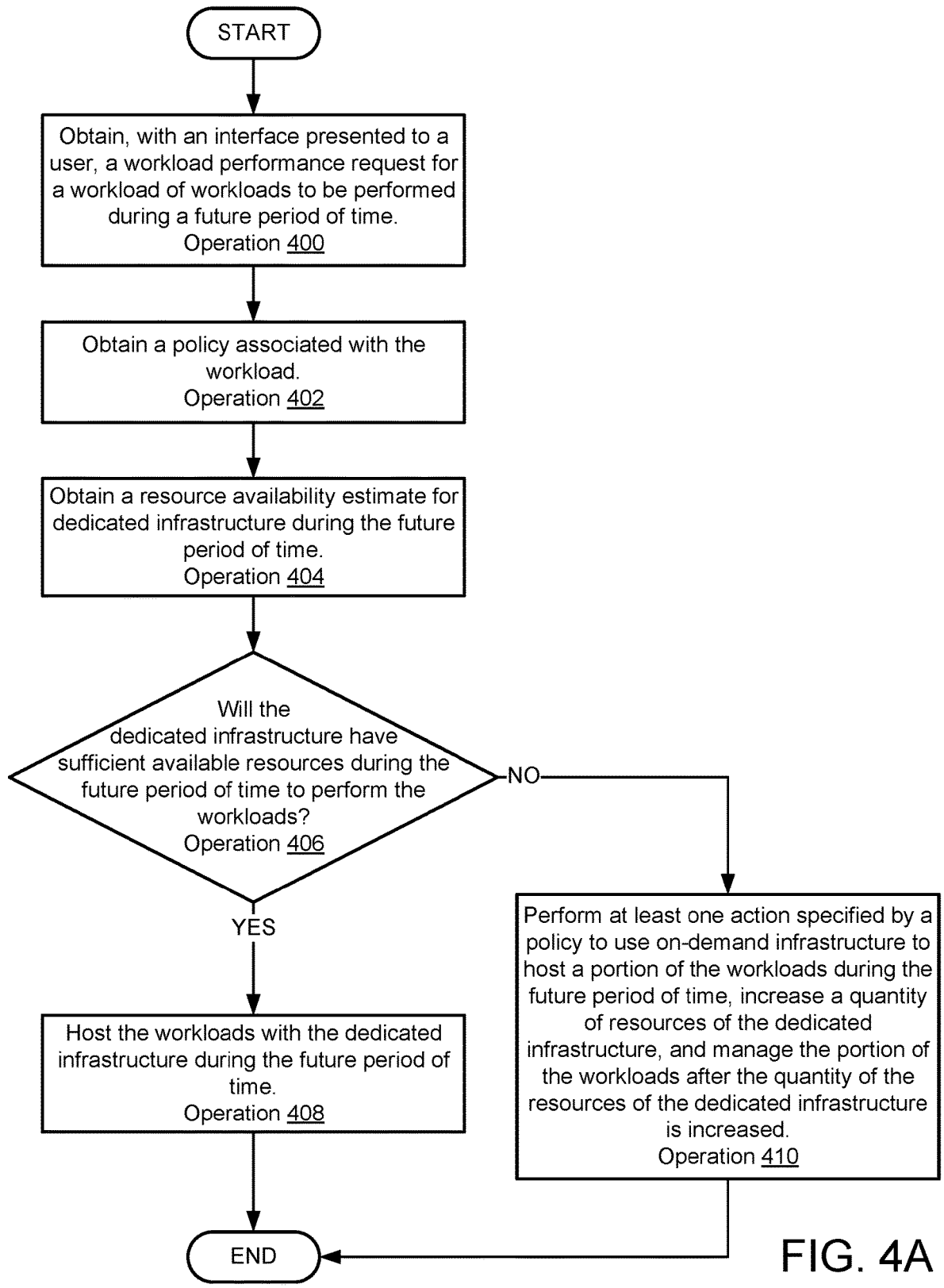
FIG. 4A shows a flow diagram illustrating a method of managing workloads in accordance with an embodiment.
Figure 4B:
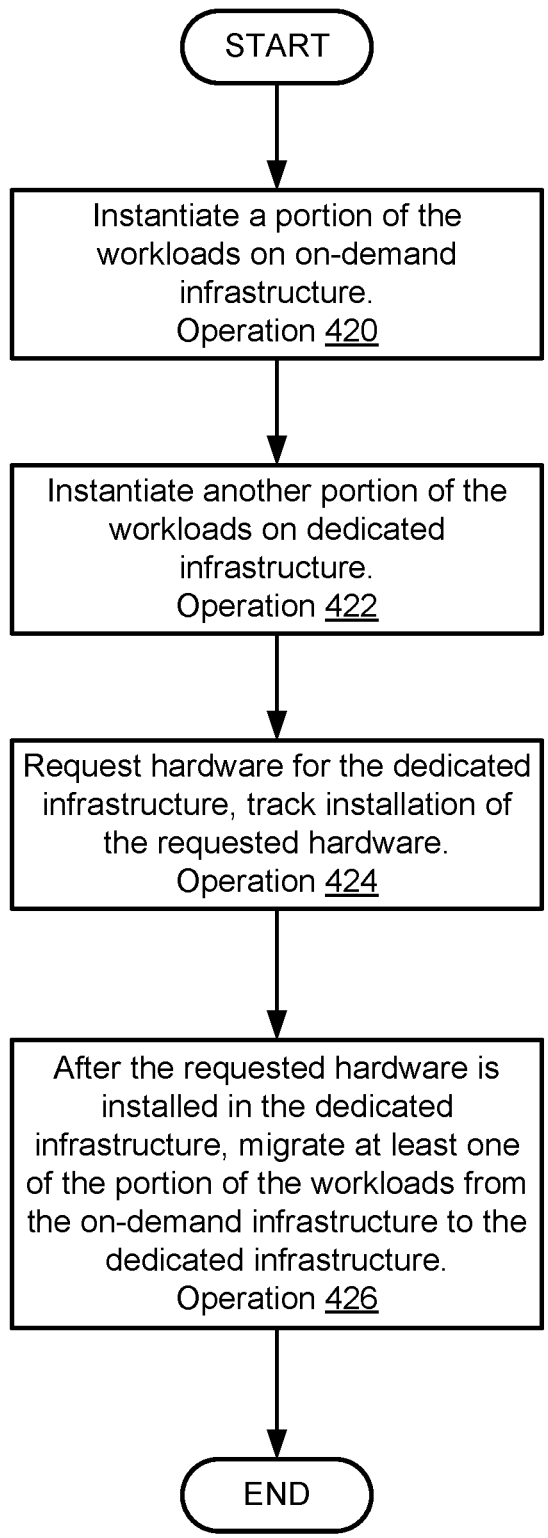
FIG. 4B shows a flow diagram illustrating a method of servicing triggered conditional actions in accordance with an embodiment.

When providing its functionality, workload manager 202 may perform all, or a portion, of the methods illustrated in FIGS. 3-4B.

In an embodiment, workload manager 202 is implemented using a hardware device including circuitry. The hardware device may be, for example, a digital signal processor, a field programmable gate array, or an application specific integrated circuit. The circuitry may be adapted to cause the hardware device to perform the functionality of workload manager 202. Workload manager 202 may be implemented using other types of hardware devices without departing from embodiments disclosed herein.

In one embodiment, workload manager 202 is implemented using a processor adapted to execute computing code stored on a persistent storage that when executed by the processor performs the functionality of workload manager 202 discussed throughout this application. The processor may be a hardware processor including circuitry such as, for example, a central processing unit or a microcontroller. The processor may be other types of hardware devices for processing digital information without departing from embodiments disclosed herein.

When providing its functionality, workload manager 202 may store data and use data stored in storage 210.

In an embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The data structure illustrated as being hosted by storage 210 may be implemented with any number and type of data structure including, for example, lists, tables, databases, linked lists, unstructured data, etc. While illustrated in FIG. 2A as being stored in an infrastructure manager, any of these data structures may be stored in other locations, may be spanned across any number of devices, and/or may be stored with additional, different, and/or less data than that described above without departing from embodiments disclosed herein.

While illustrated in FIG. 2A as including a limited number of specific components, an infrastructure manager 110 in accordance with an embodiment may include fewer, additional, and/or different components than shown in FIG. 2A.

Turning to FIG. 2B, a diagram of infrastructure map 212 in accordance with an embodiment is shown. Infrastructure map 212 may include hardware components repository 230 and hosted components repository 232.

Hardware components repository 230 may include information regarding the hardware components of dedicated infrastructure and/or on-demand infrastructure. For example, hardware components repository 230 may list quantities and types of (i) processing devices, (ii) memory devices, (iii) storage devices, (iv) communication devices, and/or (v) other devices such special purposes devices (e.g., graphics processing units, application specific integrated circuits, accelerators, etc.).

Hosted components repository 232 may include information regarding software components hosted by hardware components of dedicated infrastructure and/or on-demand infrastructure. For example, hosted components repository 232 may list quantities and types of (i) operating systems or other device management entities, (ii) drivers, (iii) firmware, and/or (iv) other types of hosted components.

Turning to FIG. 2C, a diagram of policy repository 216 in accordance with an embodiment is shown. Policy repository 216 may include one or more policies used to manage workloads performed by available infrastructure.

Security policies 242 may specify one or more security requirements for workloads. The security requirements may specify that some workloads may only be hosted by dedicated infrastructure. For example, security policies 242 may specify a list of workloads (e.g., or workload types) that may only be hosted by dedicated infrastructure. Security policies 242 may also specify other workloads that are preferred to be hosted by dedicated infrastructure. For example, security policies 242 may specify a list of workloads (e.g., or workload types) that are preferred to be hosted by dedicated infrastructure.

One or more of security policies 242 may be used to ensure compliance with various regulations regarding data (e.g., personal information, healthcare information, etc.). As the regulatory landscape has increased in complexity, the improper disclosure of various types of data may subject organizations to significant financial penalties. Some of the security policies 242 may be put in place to limitations on where workloads which may include regulated data may be placed. By doing so, an organization may automatically comply with regulations on various types of data without needing to review each workload request by hand. Rather, by enforcing the securities policies 242, an organization may automatically comply with corresponding regulatory frameworks.

User policies 244 may specify one or more restrictions for users that may request that workloads be performed. For example, user policies 244 may specify, for example, (i) types of workloads various users are authorized to have instantiated and/or (ii) locations (e.g., dedicated or on-demand infrastructure) where users are authorized to have workloads instantiated.

Workload type policies 246 may include policies that specify conditional actions to be performed to manage workloads. The policies of the workload type policies 246 may be keyed to workload types. The polices of the workload type policies 246 may be defined by administrators or other persons. The policies may be obtained via an interface presented to the administrator or other persons. The interface may include a wizard for preparing a policy for workload type policies 246.

In an embodiment, a policy of workload type policies 246 specifies (i) one or more actions to be performed in response to a capacity estimate for dedicated infrastructure 102 meeting a threshold, and (ii) one or more actions to be performed in response to the computing resources of dedicated infrastructure 102 being expanded.

For example, the policy may specify that, when a capacity estimate for the dedicated infrastructure 102 indicates that the workload capacity of dedicated infrastructure will fall below a predetermined threshold in the future, then (i) a requisition for additional hardware for the dedicated infrastructure is to be made, (ii) one or more workloads are to be migrated from the dedicated infrastructure to the on-demand infrastructure, and/or (iii) a user is to be notified of the occurrence of the conditioning triggering performance of the conditional actions.

In another example, the policy may specify that, when hardware is added to dedicated infrastructure (or the computing resources of the dedicated infrastructure are increased due to, for example, changes in hosted components), then (i) one or more workloads are to be migrated from the on-demand infrastructure to the dedicated infrastructure, and/or (ii) a user is to be notified of the occurrence of the conditioning triggering performance of the conditional actions.

In another embodiment, a policy of workload type policies 246 specifies one or more restrictions on where a workload may be placed. For example, the restrictions may be used to comply with various regulatory requirements, such as regulations regarding personal data, health care information, or other types of information for which regulatory frame works are in place. The one or more restrictions may be set to ensure that a workload is instantiated in a location that would cause data subject to a regulatory requirement to be improperly disclosed to another party, such as an owner or host of on-demand infrastructure. These one or more restrictions may, like the other policies of the workload type policies 246, be obtained via a user interface presented to a user which may granularly define actions, restrictions, and/or preferences for various workload types.

Procurement policies 248 may include policies that specify restrictions on procurement of additional hardware for dedicated infrastructure. The restrictions may, for example, place limits on the cost of hardware that may be requisitioned within a period of time, limit the types of hardware that may be requisitioned, may limit which types of conditions that may be used to trigger hardware procurement for dedicated infrastructure, etc.

Workload performance policies 250 may include policies that specify expected levels of performance for different types of workloads. For example, when a workload is instantiated, a quantity of computing resources may be dedicated for its performance. Different performance levels for the workload may be provided by dedicating different quantities of computing resources. The workload performance policies 250 may be used, for example, to determine a quantity of computing resources to dedicate to the performance of different workloads. For example, workload performance policies 250 may specify a minimum expected performance for different types of workloads and/or minimum quantities of computing resources expected to be dedicated for the performance of different types of workloads.

Any of the policies of policy repository 216 may conflict with one another. To ascertain which policies (or portions thereof) to utilize and/or enforce, a conflict resolution process may be performed. Any of the policies may include a relative ranking with respect to other policies. When a conflict occurs, the conflict between two policies may be resolved by not enforcing and/or using the conflicting policy that has a lower ranking than the other conflicting policy, or portions thereof. For example, when a conflict arises, only the portion of the lower ranked policy that is in conflict may not be used and/or enforced. The remaining portion of the conflicting policy may be used and/or enforced.

For example, consider a scenario where (i) a policy of workload type policies 246 associated with a database type workload specifies that hardware is to be requisitioned for dedicated infrastructure when a predicted future capacity of the dedicated infrastructure falls below 20% available and (ii) a policy of procurement policies 248 specifies that hardware is not to be requisitioned for database type workloads. If the procurement policies 248 are ranked higher than the workload type policies, then the hardware requisition action of the policy of the workload type policies 246 may not be enforced to resolve the conflict.

Any of the policies of policy repository 216 may be, for example, set by an administrator or other person using an interface. The policies may be set via other methods without departing from embodiments disclosed herein.

As discussed above, the components of FIG. 1 may perform various methods to manage configurable devices. FIGS. 3, 4A, and 4B illustrate methods that may be performed by the components of FIG. 1. In the diagrams discussed below and shown in FIGS. 3, 4A, and 4B, any of the operations may be repeated, performed in different orders, and/or performed in parallel with or in a partially overlapping in time manner with other operations.

Turning to FIG. 3, a flow diagram illustrating a method of establishing a policy in accordance with an embodiment is shown.

At operation 300, an interface is presented to a user. The user may be an administrator. The interface may act as a wizard for establishing policies. For example, the interface may include fields for (i) conditions and (ii) actions to be performed upon the occurrence of the conditions.

In an embodiment, a condition is when a capacity estimate for dedicated infrastructure indicates that the workload capacity for the dedicated infrastructure will fall below a threshold.

In an embodiment, a condition is when a capacity estimate for dedicated infrastructure indicates that the available computing resources of the dedicated infrastructure will fall below a threshold.

In an embodiment, a condition is when computing resources of the dedicated infrastructure are expanded (e.g., via addition of hardware).

In an embodiment, a condition is when a capacity estimate for dedicated infrastructure indicates that the workload capacity for the dedicated infrastructure will increase from below a threshold to above the threshold.

In an embodiment, a condition is when a capacity estimate for dedicated infrastructure indicates that the available computing resources of the dedicated infrastructure will increase from below a threshold to above the threshold.

In an embodiment, action to be performed upon occurrence of one or more of the conditions include one or more of (i) migrating workloads between dedicated and on-demand infrastructure, (ii) automatically requisitioning hardware for the dedicated infrastructure, and/or (iii) notifying one or more persons of the occurrence of a condition. If hardware is automatically requisitioned, a future migration plan may also be established. The future migration plan may specify when and which workloads are to be migrated from on-demand infrastructure to dedicated infrastructure after the computing resources/capacity of the dedicated infrastructure increases.

At operation 302, at least one condition and at least one action associated with the condition are obtained using the interface. The condition and action may be obtained by receiving input from the user via the user interface. Any number of conditions and corresponding actions may be obtained via the interface.

At operation 304, it is determined whether other conditional actions for the workload type are available. The determination may be made with the user interface. For example, the user interface may, after a condition and corresponding actions are obtained, prompt the user to indicate whether a corresponding policy being defined through the interface will include additional conditions and corresponding actions. The determination may be made based on input from the user when so prompted.

If there are other conditional actions for the workload type (e.g., for the policy being defined), then the method may return to operation 302. Otherwise, the method may proceed to operation 306.

At operation 306, it is determined whether there are any policies that conflict with the conditions and corresponding actions obtained in operations 302-304. For example, as discussed with respect to FIG. 2C, any number of policies may be present that may conflict with one another and/or policies that are being established. The determination may be made by, for example, comparing the conditions and corresponding actions to the other policies maintained by infrastructure manager 110 of FIG. 1.

If it is determined that there are one or more conflicts, then the method may proceed to operation 310. Otherwise the method may proceed to operation 308.

In operation 308, a policy is established based on the obtained conditional actions (e.g., via operations 302-304). The conditional actions used in operation 308 may be conflict free. In the event that a conflict exists between the conditional actions of operations 302-304 and one or more policies, the conflicts may be resolved via operation 310 prior to establishing of the policy. The resulting policy may be based on the conflict-resolved conditional actions when it is determined that there is at least one conflict at operation 306.

The policy may be established by, for example, updating a policy of workload type policies 246 of policy repository 216. For example, a new policy may be added or an existing policy may be updated to establish the policy.

The method may end following operation 308.

Returning to operation 306, the method may proceed to operation 310 following operation 306 when it is determined that there is at least one conflict between conditional actions obtained in operations 302-304 and one or more policies.

At operation 310, the conflicts are resolved. The conflicts may be resolved by, for example, not using one or more portions of the conditional actions obtained in operations 302-304. For example, any actions that conflict with restrictions or other aspects of existing policies may be removed or otherwise not used to establish the policy in operation 308.

Using the method illustrated in FIG. 3, various types of polices may be established. The policies may be used to automatically manage the process of instantiating workloads and performance of the workloads.

Turning to FIG. 4A, a flow diagram illustrating a method of servicing workload requests in accordance with an embodiment is shown.

At operation 400, a workload performance request for a workload of workloads to be performed during a future period of time is obtained. The workload may be obtained via an interface. The interface may be presented to a user. The user may input information for the workload request via the interface. For example, the user may specify a type of the workload, expectations regarding performance of the workload, etc.

At operation 402, a policy associated with the workload is obtained. The policy may be obtained by, for example, matching a type of the workload to the policy. For example, the policy may include or otherwise indicate a workload type to which it is associated. The matching may be performed via any method.

The policy may be obtained by, for example, reading it from a policy repository. The policy may have been generated via the method illustrated in FIG. 3.

At operation 404, a resource availability estimate (e.g., a capacity estimate) for dedicated infrastructure during the future period of time is obtained. The resource availability estimate may be obtained using an inference model. The inference model may take, as input, historic data regarding the operation of dedicated infrastructure and provide the resource availability estimate as the output.

In an embodiment, the inference model is a regression model. For example, the regression model may take, as input, workload requests received over a past period of time and predict how many workload requests are likely to be received over the future period of time.

The regression model may, for example, take workload requests received over multiple past periods of time (e.g., similar times during multiple cycles such as each day) and generate a histogram describing the distribution of workload requests received over the multiple past period of time. The regression model may fit a line to the histogram to reduce noise and/or other artifacts in the historical data upon which the estimate is based. The regression model may be used to predict how many workload requests are likely to be received over the future period of time.

A resource cost for performing the workloads for the predicted workload requests may be obtained. The resource cost may be multidimensional. For example, the resource cost may include separate dimensions for different types of computing resources (e.g., processing resources, memory resources, storage resources, etc.).

The resource cost may be obtained by, for example, sampling various workloads performed in the past to ascertain the resource cost for performing the workloads. The various workloads may include a population of workloads representative of the types of workloads that the dedicated infrastructure may host during the future period of time. The sampling may be multidimensional, like the resource cost.

The resource cost may be obtained by multiplying each of the workloads to service the predicted workload requests (e.g., a number of workloads likely to be performed during the future period of time) by the computing resources used to perform the corresponding sampled workloads (e.g., similar workloads).

The resource availability estimate may be made by subtracting the resource cost from the computing resources (e.g., for the future period of time and which may also be multidimensional) of the dedicated infrastructure.

In an embodiment, the inference model is a trained machine learning model. The machine learning model may be trained using historic operation data of the dedicated infrastructure (e.g., available resources over time). The resource availability estimate may be generated with the trained machine learning model (e.g., which may take a current point of time as an input and provide the resource availability estimate as the output).

At operation 406, it is determined whether the dedicated infrastructure will have sufficient available resources during the future period of time to perform the workloads. The determination may be made, for example, by ascertaining whether any conditional actions of policies are triggered for performance based on the resource availability estimate.

If any conditional actions are triggered, then the method may proceed to operation 408. Otherwise the method may proceed to operation 410 following operation 406.

At operation 408, the workloads are hosted with the dedicated infrastructure during the future period of time. In other words, all of the workloads may be instantiated in the dedicated infrastructure, already instantiated workloads on the dedicated infrastructure may be maintained, and/or other workloads hosted by on-demand infrastructure may be migrated to the dedicated infrastructure.

The method may end following operation 408.

Returning to operation 406, the method may proceed to operation 410 following operation 408 when it is determined that the dedicated infrastructure will not have sufficient available resources during the future period of time to perform the workloads.

At operation 410, at least one action, specified by a policy, to use on-demand infrastructure to host a portion of the workloads during the future period of time is performed. A quantity of resources of the dedicated infrastructure may also be increased (e.g., by requisitioning additional hardware for the dedicated infrastructure if so indicated by a policy). Also the portion of the workloads may be managed after the quantity of the resources of the dedicated infrastructure is increased.

The portion of the workloads may be managed by setting in place a migration plan for one or more of the portion of the workloads. The migration plan may specify that the one or more workloads are to be migrated to the dedicated infrastructure after the quantity of resources of the dedicated infrastructure is increased.

In an embodiment, the quantity of resources of the dedicated resources is increased by sending a requisition request for hardware for the dedicated infrastructure. The hardware may be specified by a policy triggered by the resource availability estimate. For example, one or more policies for the dedicated infrastructure may specify hardware additions to be added to the dedicated infrastructure when it is predicted that the resource availability estimate for the dedicated infrastructure falls below one or more thresholds (e.g., thereby triggering performance of conditional actions for increasing the resources of the dedicated infrastructure).

In an embodiment, the portion of the workloads is selected from the workloads based on one or more policies associated with the workloads. As discussed with respect to FIG. 2C, one or more policies may specify restrictions on where workloads may be performed. The portion of the workloads may be selected based on these restrictions.

In an embodiment, the portion of the workloads is selected from the workloads based on one or more policies associated with the workloads. As discussed with respect to FIG. 2C, one or more policies may specify conditional actions that specify migration of workloads from the dedicated infrastructure to the conditional infrastructure. The portion of the workloads may be selected based on these conditional actions (e.g., may be caused to be performed by the on-demand infrastructure by the performance of the conditional actions).

In an embodiment, at least one workload requested to be performed during the future period of time is not instantiated on the dedicated infrastructure or the on-demand infrastructure. For example, one or more policies may restrict where some workloads may be performed. If the resources of the dedicated infrastructure are insufficient (e.g., based on the resource availability estimate) to complete all of the workloads restricted to being hosted by the dedicated infrastructure, then one or more of the workloads restricted to being hosted by the dedicated infrastructure may not be performed. In an embodiment, all of the workloads restricted to being hosted by the dedicated infrastructure may be hosted by the dedicated infrastructure, by the quantities of computing resources allocated for the performance of these workloads may not meet those required to timely complete the workloads. In other words, the performance goals for one or more of the workloads may not be met.

Operation 410 may be performed with the method illustrated in FIG. 4B.

The method may end following operation 410.

Turning to FIG. 4A, a flow diagram illustrating a method of managing workloads in accordance with an embodiment is shown. The method shown in FIG. 4A may be performed when it is determined that dedicated infrastructure includes insufficient resources to perform one or more workloads during a period of time (e.g., a future period of time).

Prior to operation 420, the workloads may be divided into multiple portions. A one portion of the workloads may be for workloads that will be performed on dedicated infrastructure. The workloads of this portion may be selected based on, for example, policy restrictions regarding where different workloads may be performed, various relative rankings of the workloads with respect to one another, and/or on other basis.

Another portion of the workloads may be for workloads that will be performed on on-demand infrastructure. The workloads of the other portion may be selected based on, for example, policy restrictions regarding where different workloads may be performed, conditional actions triggered for performance (e.g., that cause workloads to be automatically transferred from dedicated infrastructure to on-demand infrastructure), and/or other basis.

A further portion of the workloads may be for workloads that will not be performed even though requests for their performance during the period of time have been obtained. The workloads of the further portion may be selected based on, for example, policy restrictions regarding where different workloads may be performed, various relative rankings of the workloads with respect to one another, and/or on other basis.

At operation 420, a portion of the workloads are instantiated on the on-demand infrastructure, the portion may be the other portion, discussed above. The portion of the workloads may be instantiated by, for example, causing the on-demand infrastructure to perform one or more actions for the portion of the workloads. In an embodiment, the workloads are instantiated by beginning performance of one or more actions for a new workload or by performing one or more actions for an existing workload that is being migrated from the dedicated infrastructure to the on-demand infrastructure.

In an embodiment, the on-demand infrastructure (and/or dedicated infrastructure) may include a layer of virtualization used to host any number of virtual machines. Each of the virtual machines may have access to some portion of the computing resources of the on-demand infrastructure. The workloads may be instantiated on the on-demand infrastructure by assigning one or more of the virtual machines to perform the workloads.

In an embodiment, the workloads are broken down into one or more tasks. The specific number of tasks may be based on, for example, heuristically determined relationships between numbers of tasks and completions of workloads in corresponding amounts of time. The number of tasks may be selected based on the associations and corresponding goals for the respective workloads provided in the requests. The tasks for the workloads may then be distributed to the virtual machines for sequential and/or parallel processing thereby allowing for workloads to be completed in corresponding amounts of time as desired by the persons that requested performance of the workloads. In this manner, the resources of the on-demand (and/or dedicated infrastructure using a similar processes) may be efficiently deployed for performance of the workloads.

At operation 422, another portions of the workloads are instantiated on the dedicated infrastructure. The another portion of the workloads may be instantiated in a similar manner as discussed with respect to the instantiation of the portion of the workloads on the on-demand infrastructure. In an embodiment, the workloads are instantiated by beginning performance of one or more actions for a new workload or by performing one or more actions for an existing workload that is being migrated from the on-demand infrastructure to the dedicated infrastructure.

At operation 424, hardware for the dedicated infrastructure is requested, and installation of the requested hardware is tracked. In an embodiment, the hardware is requested by sending a request to a support manager that may cause, in response to the request, the hardware to be sent to the dedicated infrastructure. The hardware may be selected on the basis of one or more conditional actions that have been triggered. For example, the conditional actions may (i) specify the hardware to be requested, (ii) indicate that an automated review of the dedicated infrastructure should be performed to determine the hardware that is to be added to the dedicated infrastructure, and/or (iii) indicate that a review of the dedicated infrastructure by a person should be performed to determine the hardware that is to be added to the dedicated infrastructure.

When the conditional action indicates that an automated review is to be performed, then the predicted future capacity of the dedicated infrastructure may be reviewed to identify the type and quantity of hardware to be requisitioned. For example, the predicted future capacity may indicate that certain types of computing resources are plentiful while other types of computing resources are less plentiful. The hardware may be selected on the basis of the computing resources that are indicated as being less plentiful (and that may have triggered performance of one or more conditional actions).

At operation 426, the requested hardware is installed in the dedicated infrastructure, and at least one of the second portion of the workloads is migrated from the on-demand infrastructure to the dedicated infrastructure. When the requested hardware is installed, an infrastructure map may be updated. Updating the infrastructure map may trigger performance of one or more conditional actions. The conditional actions may specify migration of the at least one of the second portion of the workloads from the on-demand infrastructure to the dedicated infrastructure.

In an embodiment, the at least one of the second portion of the workloads is migrated from the on-demand infrastructure to the dedicated infrastructure by (i) suspending performance of one or more actions by the on-demand infrastructure and (ii) initiating performance of the one or more actions by the dedicated infrastructure. To do so, virtual machines hosted by the respective portions of infrastructure may be instructed or otherwise indicated to stop/being performance of the one or more actions. Data corresponding to the at least one of the second portion of the workloads stored in the on-demand infrastructure may also be transferred to the dedicated infrastructure.

The method may end following operation 426.

Turning to FIGS. 5A-5H, diagrams illustrating a workload management process in accordance with an embodiment is shown. In each of these figures, a system similar to that shown in FIG. 1 is illustrated as the system operates over time. The system in these figures may include user devices including a product developer user device 520 which is used by a product developer employee of a business and a product manager user device 522 which is used by a product manager employee of the business.

The business may have access to dedicated infrastructure included company server 502 and on-demand infrastructure including cloud server 504. Workloads performed by company server 502 may not incur cost and may be considered more secure when compared to workloads performed by cloud server 504 which may incur incremental cost.

To manage various workloads for the company, the company may utilize hardware provided by a third party supplier. The third party supplier may operate hardware vendor platform 530 which may allow hardware for company server 502 to be requisitioned.

To manage workloads, an administrator may have set a policy for workloads for shipping products. The policy may specify a preference for the workloads to be hosted by company server 502, a conditional action to, when the processing computing resources of company server 502 fall below 20% (of the total processing computing resources of company server 502), both (i) migrate workloads for the shipping products from company server 502 to cloud server 504 and (ii) requisition an additional processor for company server 502. The policy may specify another conditional action to, when the processing computing resources of company server 502 are enhanced due to addition of hardware to company server 502, migrate workloads for the shipping products from cloud server 504 to company server 502. The manager may also set a policy for workloads for beta products that specifies that such workloads may only be hosted by company server 502.

Figure 5A:
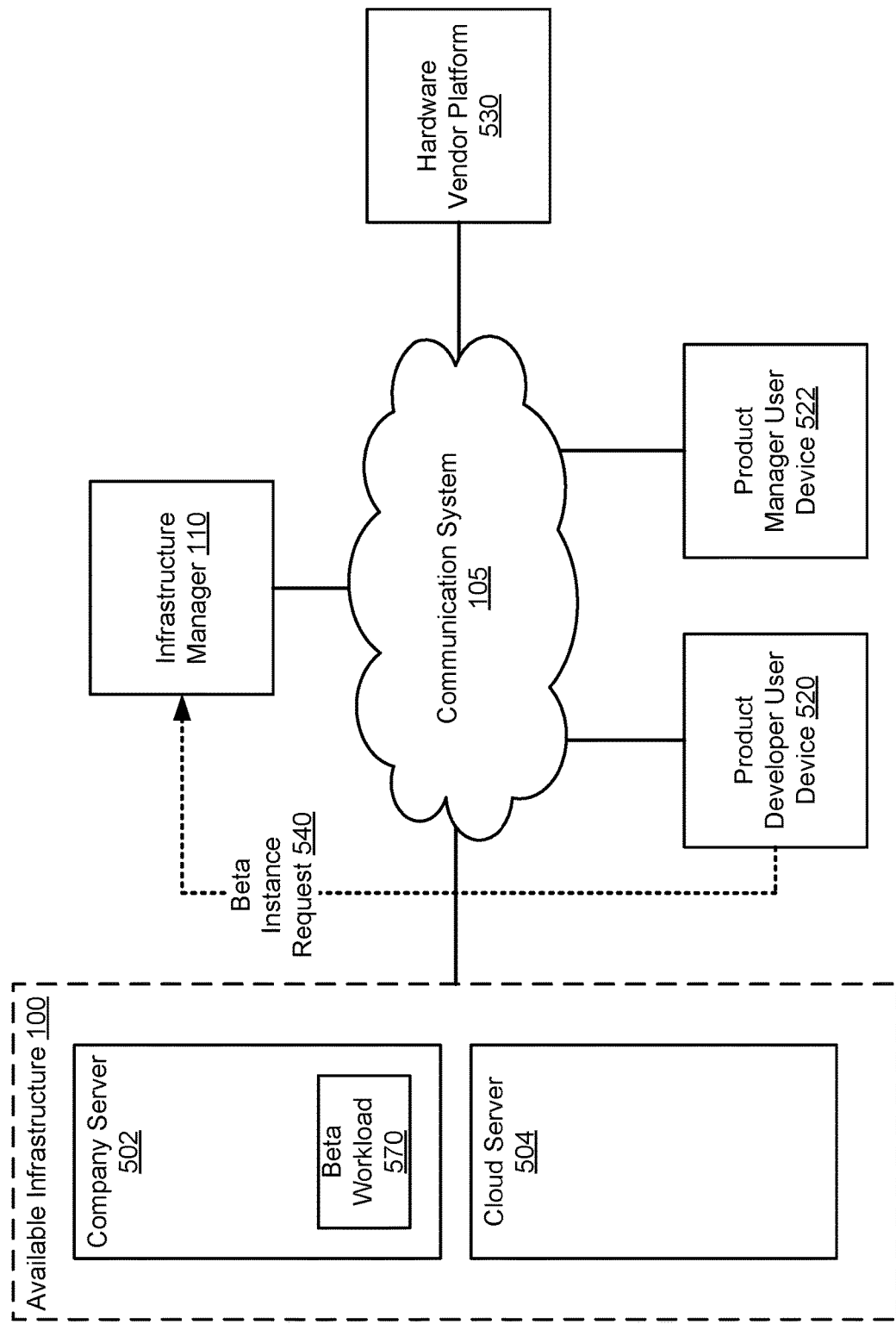
FIGS. 5A-5H show block diagrams illustrating a system in accordance with an embodiment over time.

Turning to FIG. 5A, at a first point in time the product developer uses product developer user device 520 to send beta instance request 540 to infrastructure manager 110 for a workload for a beta product. Based on its policies, infrastructure manager 110 instantiates beta workload 570 in company server 502 to service the workload request.

Figure 5B:
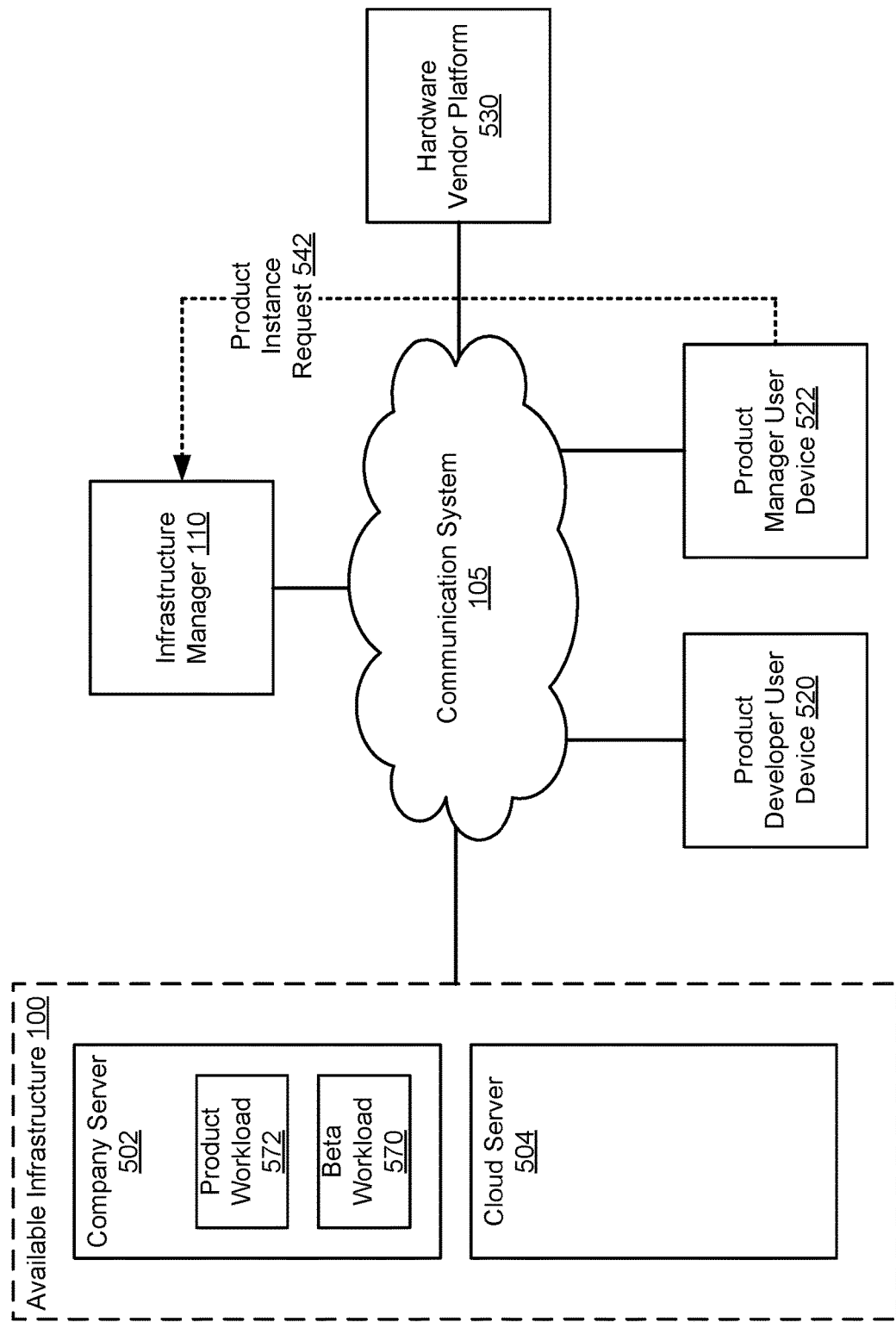

Turning to FIG. 5B at a second point in time the product manager uses product manager user device 522 to send product instance request 542 to infrastructure manager 110 for a workload for a shipping product. Based on its policies, infrastructure manager 110 instantiates product workload 572 in company server 502 to service the workload request (e.g., since a preference for company server 502 is included in the policy corresponding to shipping product workloads).

Figure 5C:
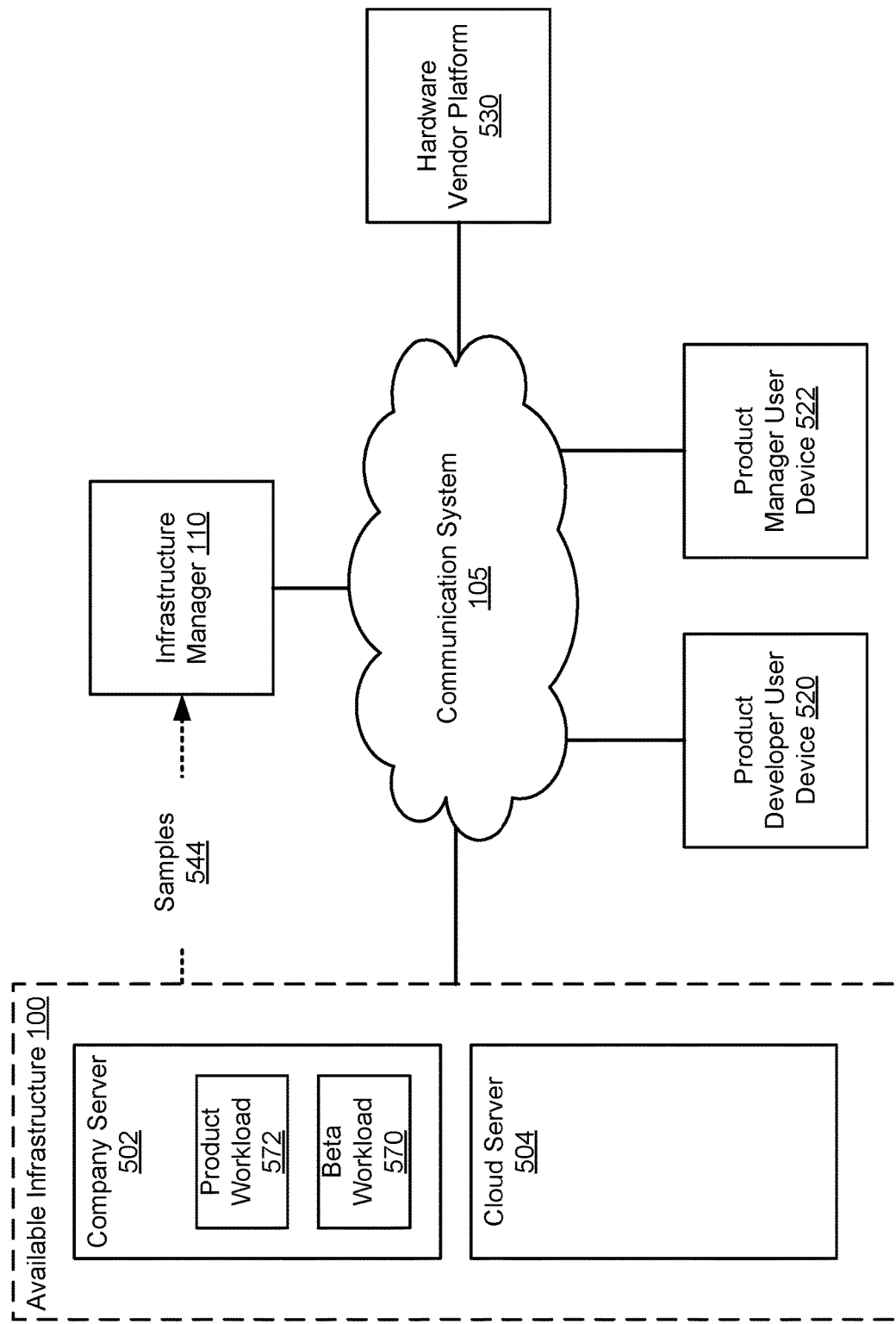

As these workloads are performed, turning to FIG. 5C, at a third point in time samples 544 for the workloads are provided to infrastructure manager 110. Using samples 544, infrastructure manager predicts that, during a period of time beginning 3 hours from now (i.e., a future time period) the available processing computing resources of company server 502 will fall below 15%. This capacity prediction for the future period of time causes the conditional action of the policy to be triggered (e.g., the conditional action triggered because the prediction of 15% fell below the threshold of 20%).

Figure 5D:
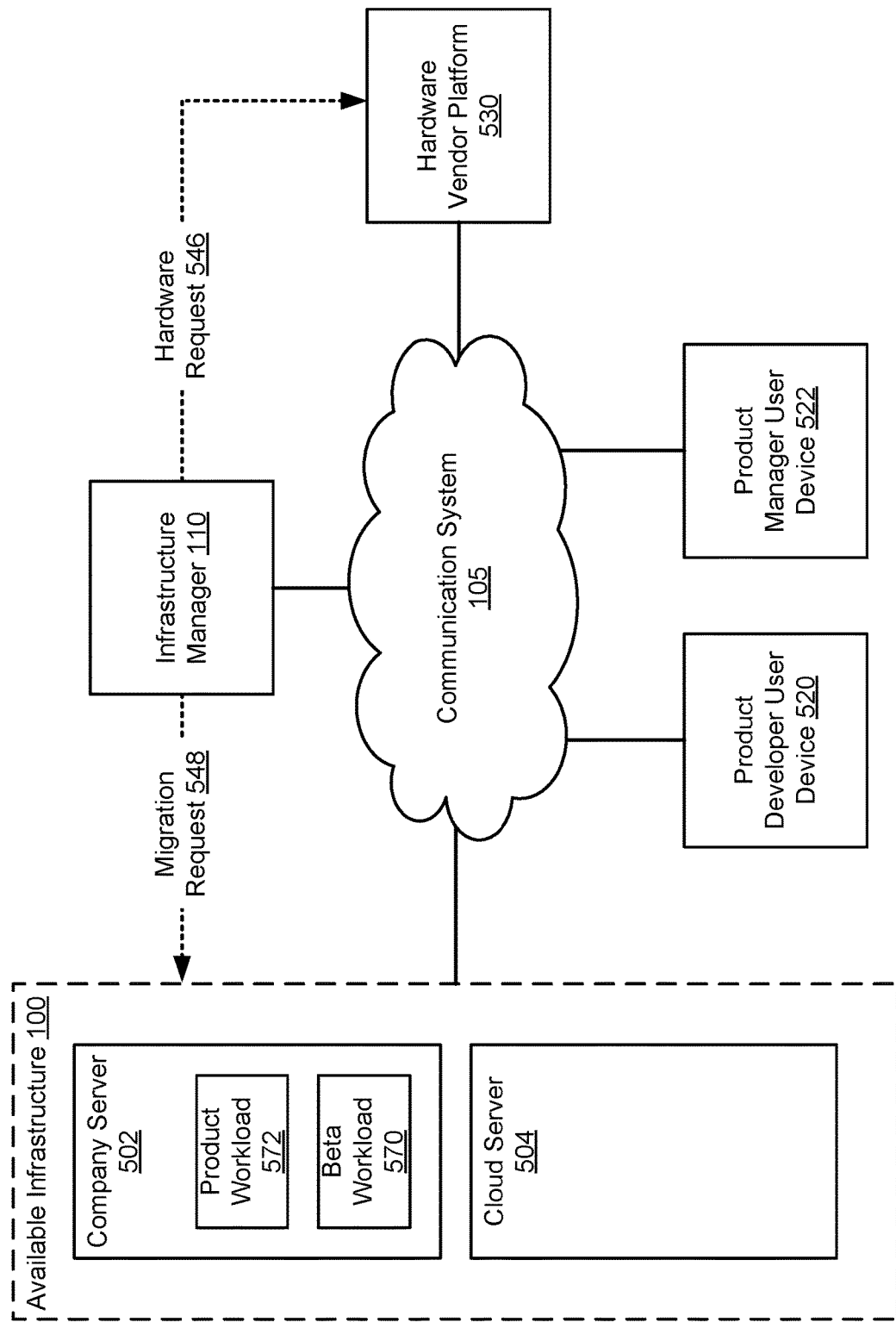

Turning to FIG. 5D, infrastructure manager 110, in response to the conditional actions being triggered for performance, sends hardware request 546 to hardware vendor platform 530. Hardware request 546 requisitions a processor for company server 502. Infrastructure manager 110 also sends migration request 548 to company server 502. Migration request 548 specifies that product workload 572 is to be migrated to cloud server 504.

Figure 5E:
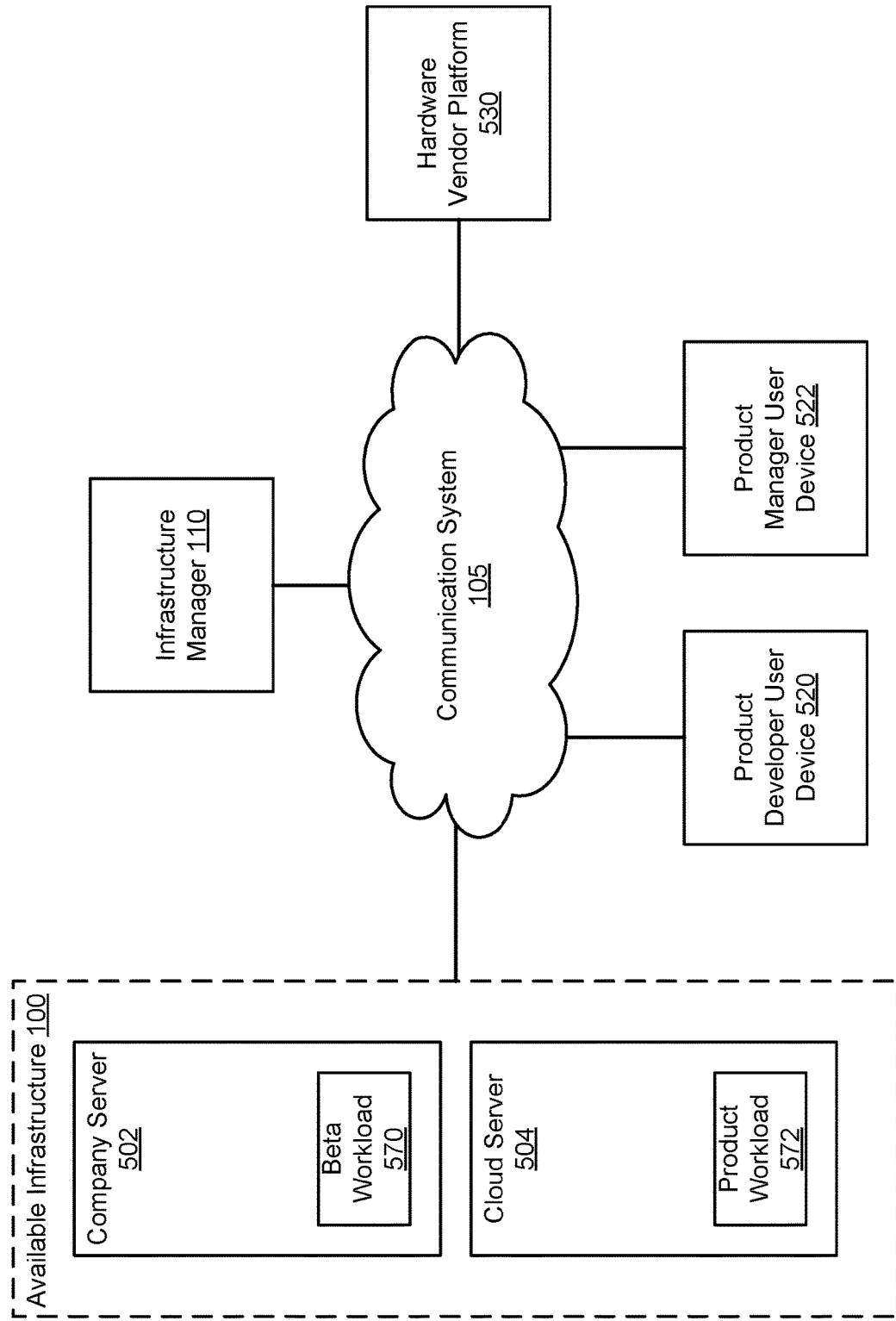

Turning to FIG. 5E, while not shown, hardware vendor platform 530 causes a processor to be shipped to the locations where company server 502 is positioned. Also, product workload 572 is now hosted by cloud server 504. In this configuration, both policies are being met (e.g., with respect to where workloads may be placed) and additional hardware is in transit to allow for the workload hosting preference for product workload 572 to be met in the future.

Figure 5F:
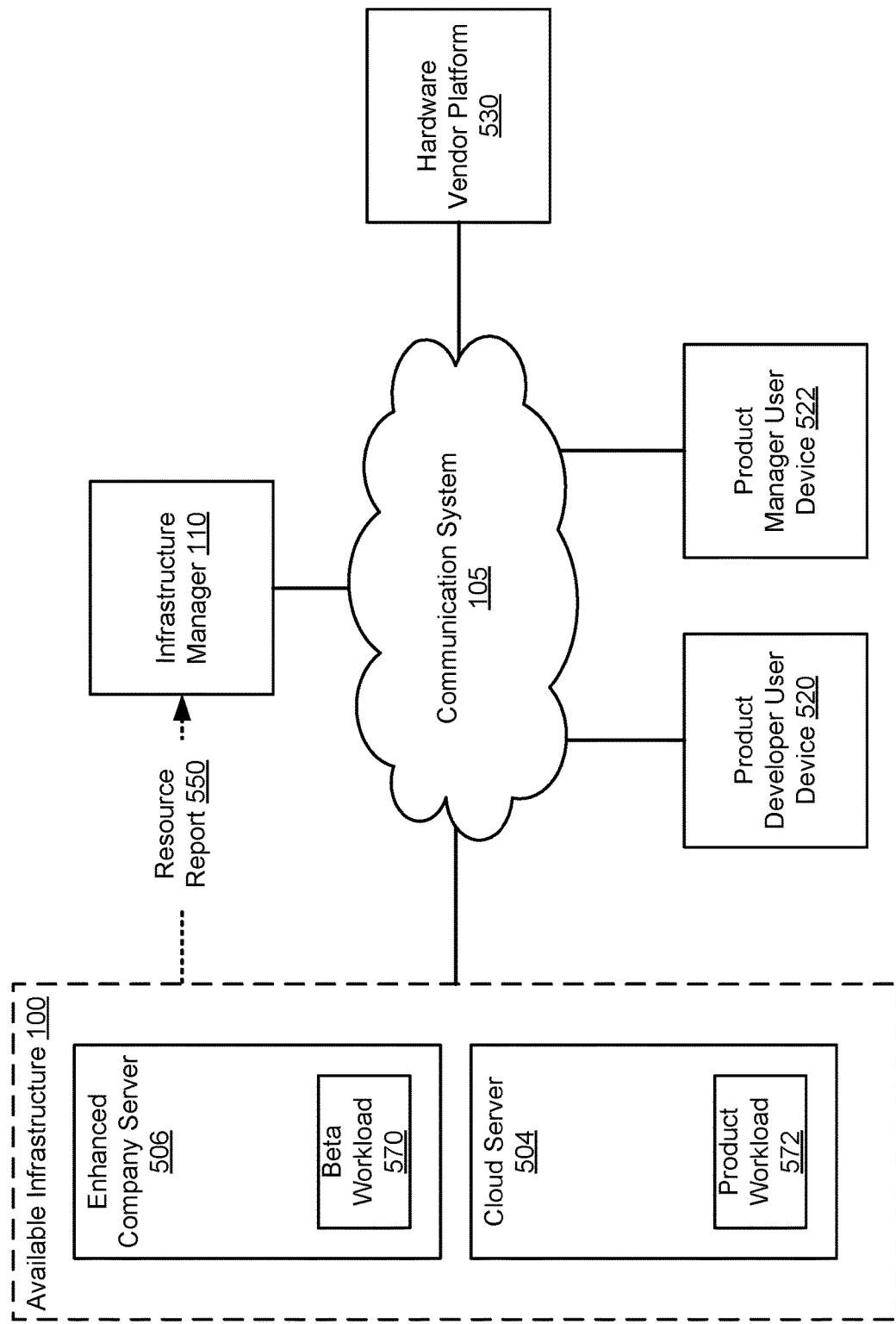

Turning to FIG. 5F, after the processor in installed in company server 502, the enhanced company server 506 sends resource report 550 to infrastructure manager 110 (e.g., as part of infrastructure manager's 110 maintenance of its infrastructure map) indicating that its processing computing resources have been expanded. This report triggers the other conditional action (e.g., the migration in response to expanded resources conditional action) of the policies implemented by infrastructure manager 110.

Figure 5G:
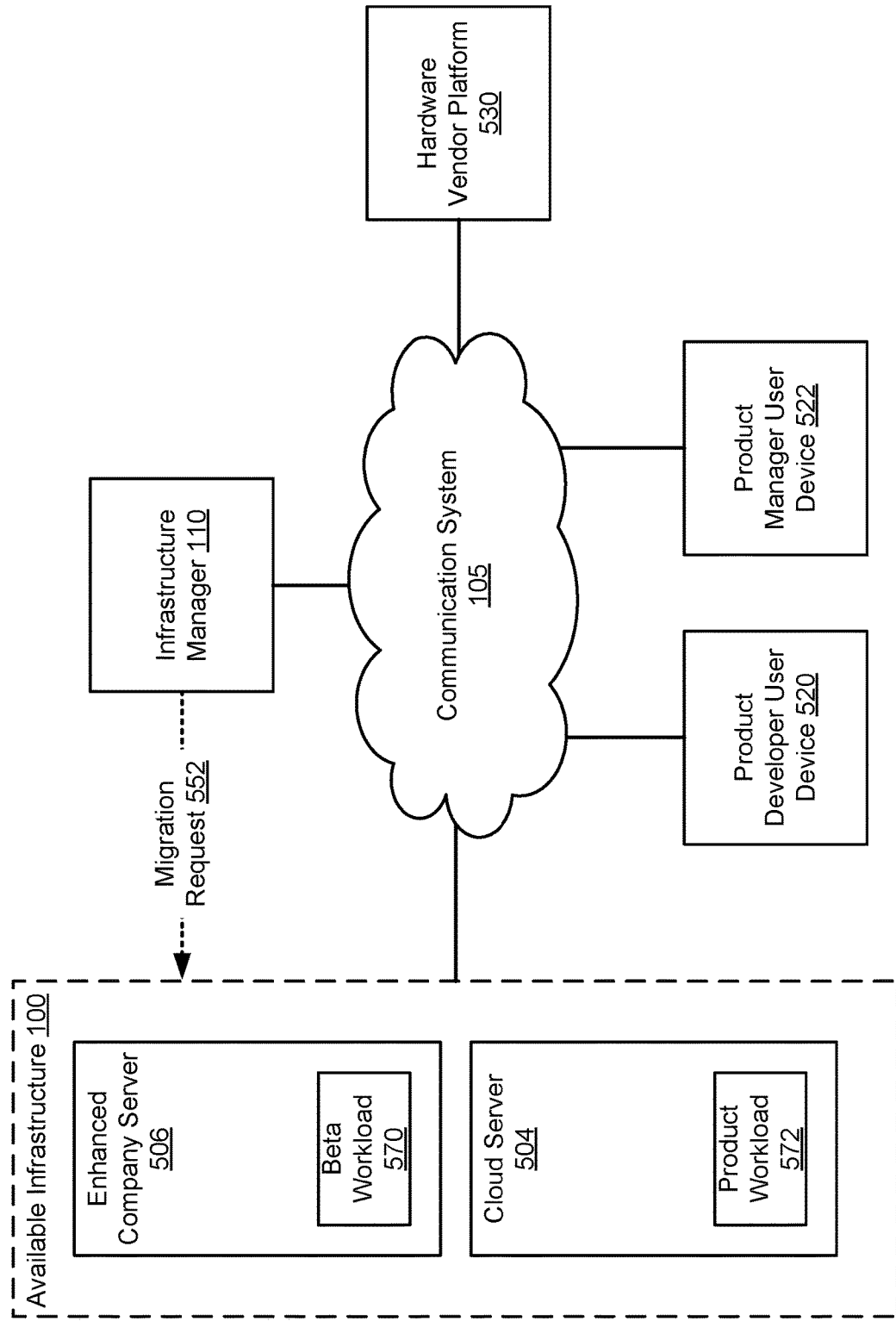

Turning to FIG. 5G, to complete the triggered conditional action, infrastructure manager 110 sends migration request 552 to available infrastructure 100. Migration request 552 specifies that product workload 572 is to be migrated to enhanced company server 506.

Figure 5H:
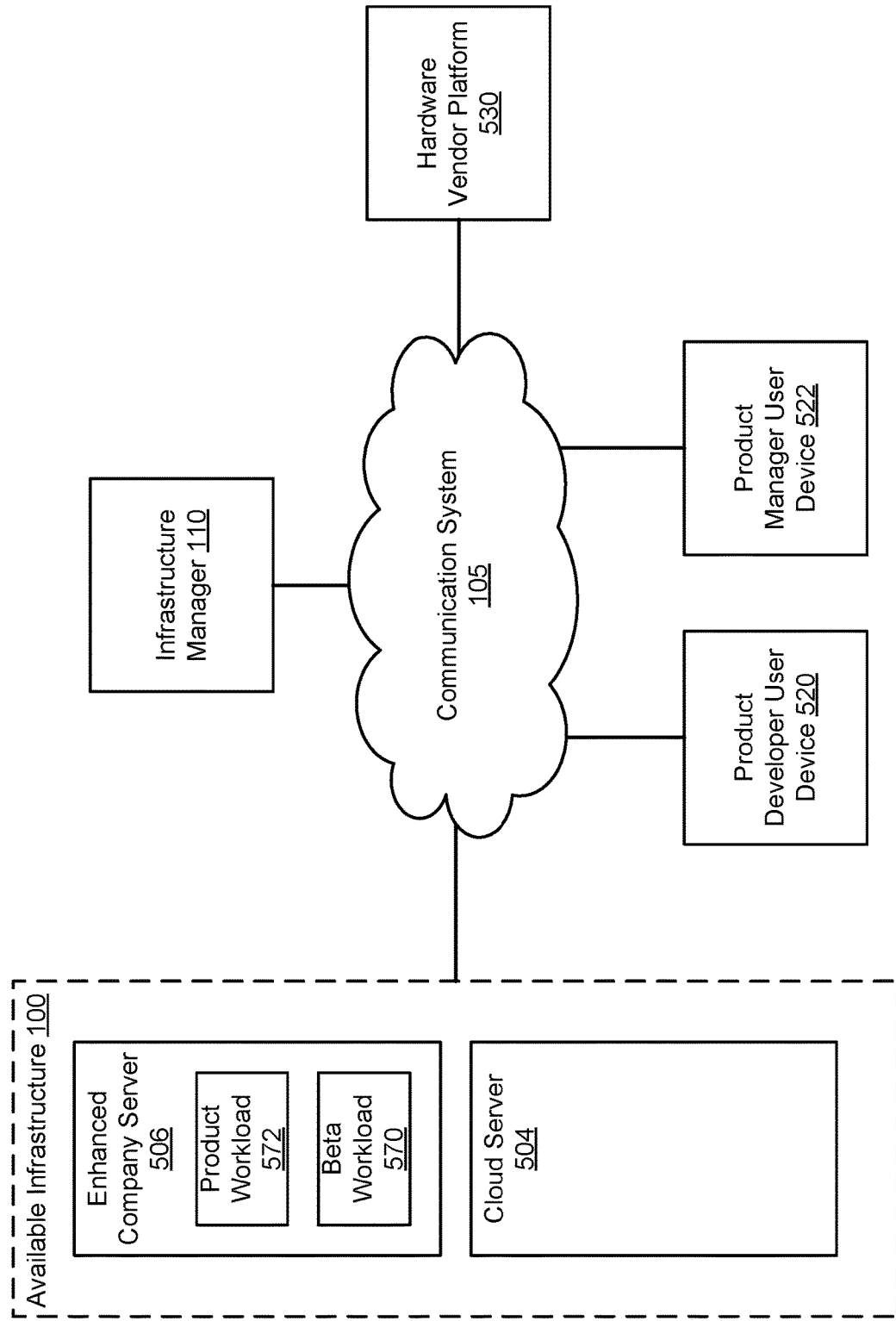

Turning to FIG. 5H, after complying with migration request 552, product workload 572 and beta workload 570 are both hosted by enhanced company server 506. In this configuration, both workloads meet both the policy requirements and preferences (e.g., hosting by dedicated infrastructure) for the workloads.

Thus, via the process illustrated in these figures, workloads may be dynamically managed in a distributed manner. As part of this process (and others discussed in this application), policies may be obtained, defined, etc.

Figure 5I:
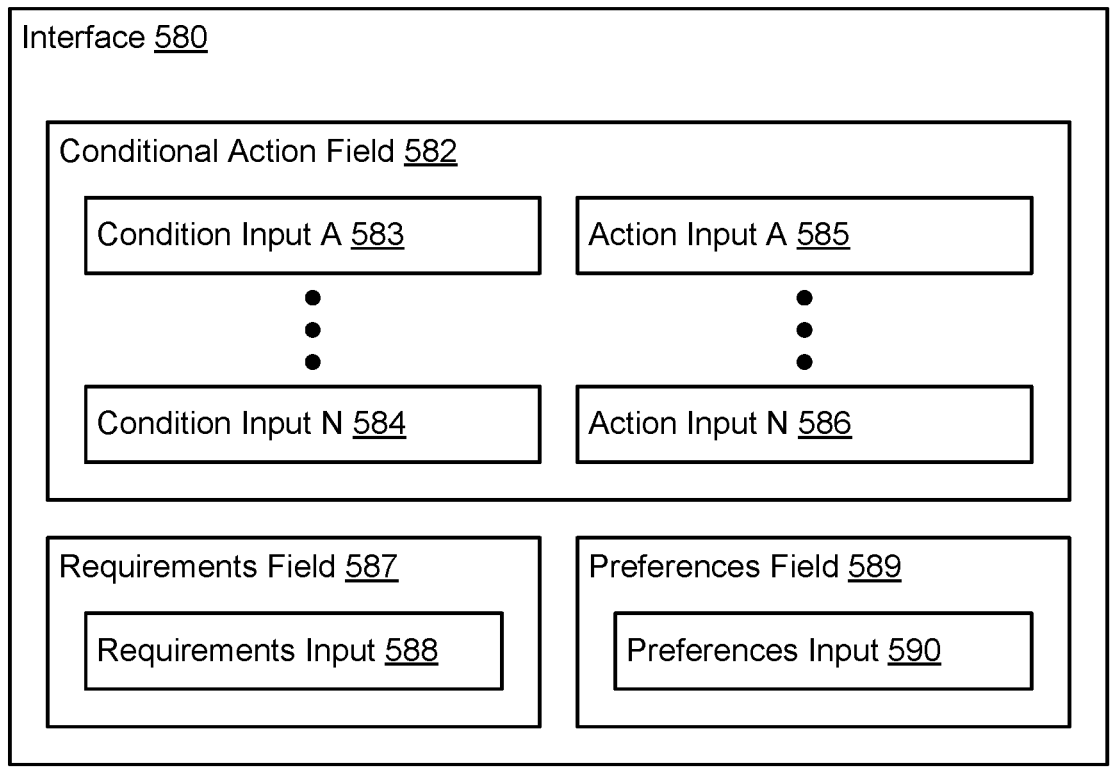
FIG. 5I show a block diagram illustrating an interface in accordance with an embodiment.

Turning to FIG. 5I, an interface 580 in accordance with an embodiment is shown. Interface 580 may be used to obtain policies. Interface 580 may be a graphical user interface presented to a person via a display. The person may be, for example, an administrator, a user, or another person of a group that may use dedicated and/or on-demand infrastructure for workloads.

Interface 580 may include conditional action field 582. Conditional action field 582 may allow any number of conditional actions of a policy to be defined. Conditional action field 582 may include one or more condition inputs 583, 584 and one or more action inputs 585, 586.

Condition inputs 583, 584 may allow a user to input a condition that upon its occurrence trigger the performance of actions defined by input received via action inputs 585, 586. Condition inputs 583, 584 may be implemented with, for example, drop down lists, boxes to receive input, radio buttons, and/or other interface elements through which a person may input information regarding the conditions for a conditional action.

Action inputs 585, 586 may allow a user to input actions that upon the occurrence of conditions defined by input received via condition inputs 583, 584 are triggered for performance. Action inputs 585, 586 may be implemented with, for example, drop down lists, boxes to receive input, radio buttons, and/or other interface elements through which a person may input information regarding actions for a conditional action.

Once conditional action field 582 has been populated, a conditional action may be added to a policy (e.g., to an existing or new policy) based on the population of the field. Once the condition action has been added, conditional action field 582 may be reset to allow additional conditional actions to be added to a field.

Interface 580 may also include requirements field 587. Requirements field 587 may allow any number of requirements for a policy to be defined. Requirements field 587 may include a requirements input 588 through which a user may define requirements for a policy.

Requirements input 588 may allow a user to specify, for example, restrictions on placement of workloads (e.g., only hostable by dedicated infrastructure, may be hosted by on-demand infrastructure, may only cost a predetermined amount for performance, etc.). Requirements input 588 may be implemented with, for example, drop down lists, boxes to receive input, radio buttons, and/or other interface elements through which a person may input information regarding the requirements for a policy.

Interface 580 may also include preferences field 589. Preferences field 589 may allow any number of preferences for a policy to be defined. preferences field 589 may include a preferences input 590 through which a user may define preferences for a policy.

Preferences input 590 may allow a user to specify, for example, preferences on placement of workloads (e.g., preferred to be hosted by dedicated infrastructure, rankings indicating relative importance with respect to other workloads, etc.). Preferences input 590 may be implemented with, for example, drop down lists, boxes to receive input, radio buttons, and/or other interface elements through which a person may input information regarding the requirements for a policy.

Once inputs have been received via one or more of the inputs 583, 584, 585, 586, 588, 590, a corresponding policy may be updated based on the received input and/or a new policy may be created based on the received input. In this manner, any number of policies may be created that may be used to govern the dynamic instantiation and migration of workloads.

Any of the field 582, 587, 589 may be implemented with any type of number of graphical elements. The graphical elements may be used to determine corresponding values for pixels used to a drive a display. Any of the fields may dynamically respond to user input received via any type of user input device such as a mouse, a touch sensitive display, a keyboard, a voice interface, etc.

Figure 6:
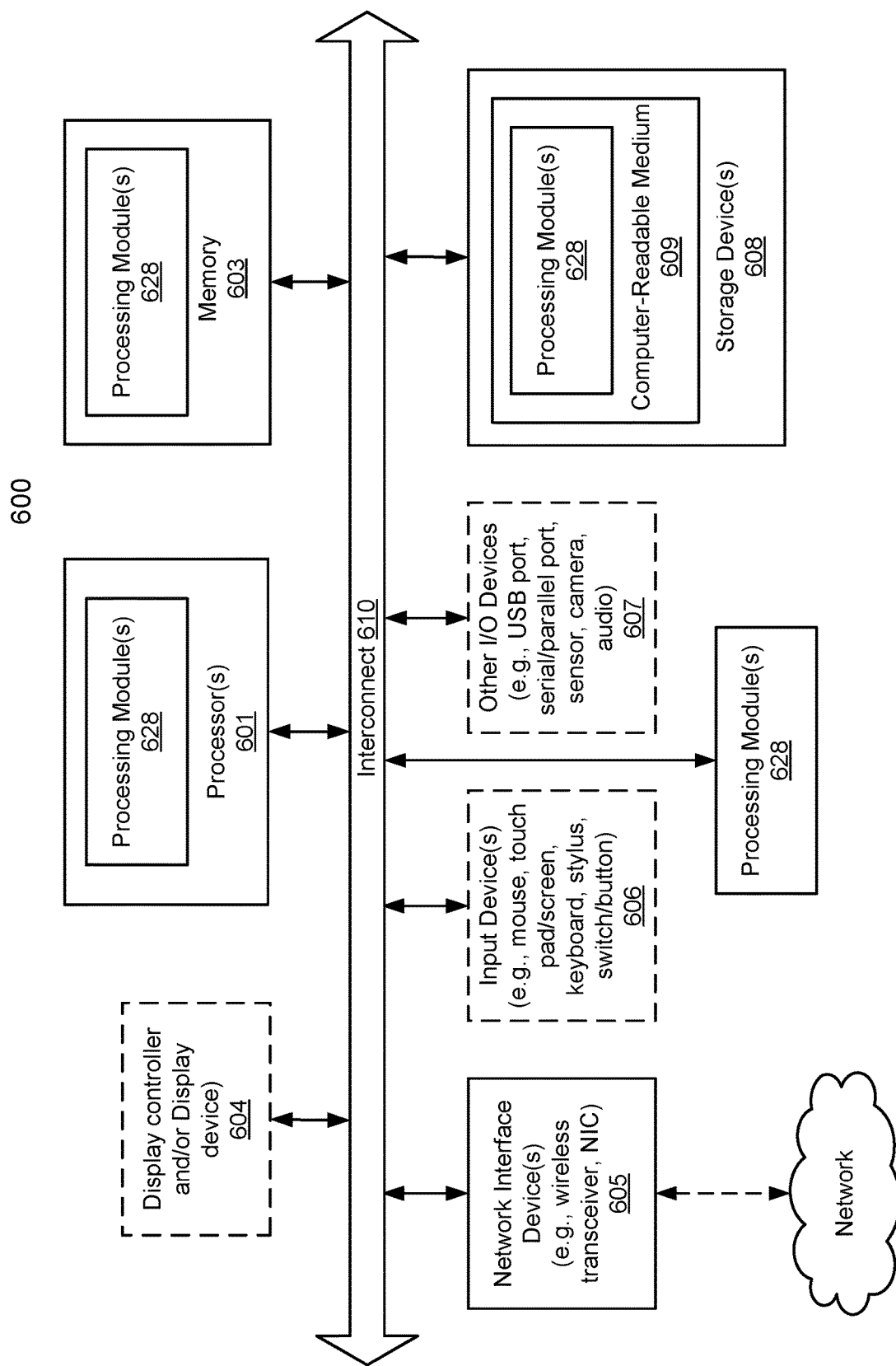
FIG. 6 shows a block diagram illustrating a data processing system in accordance with an embodiment.

Any of the components illustrated in FIGS. 1-5I may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-608 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional 10 device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A computer-implemented method for managing infrastructure comprising dedicated infrastructure and on-demand infrastructure, the computer-implemented method comprising:

obtaining, with an interface presented to a first user, a workload performance request for a workload of workloads to be performed during a future period of time;

obtaining a policy associated with the workload;

obtaining a resource availability estimate for the dedicated infrastructure during the future period of time;

making a determination, based on the resource availability estimate and the policy, that the dedicated infrastructure will not have sufficient available resources during the future period of time to perform the workload, the dedicated infrastructure comprising a first set of computing devices and the on-demand infrastructure comprising a second set of computing devices different from the first set of computing devices;

in response to the determination:
transmitting one or more requisitioning requests for new hardware components to be physically delivered to the dedicated infrastructure for manual installation into the dedicated infrastructure upon delivery, the new hardware components not being taken from the second set of computing devices and being newly deployed for a first time installment into the dedicated infrastructure, the one or more requisitioning requests being based on the policy, and the policy specifies an amount of the new hardware components that can be obtained over a single period of time using a single one of the one or more requisitioning requests;

increasing a quantity of resources of the dedicated infrastructure using the new hardware components that are actually manually installed into the dedicated infrastructure; and migrating a first portion of the workload based on a security restriction on the workload specified in the policy, the security restriction defining a time limit on the on-demand infrastructure for hosting the first portion; and after transmitting the one or more requisitioning requests and before the new hardware components are actually manually installed into the dedicated infrastructure:
  generating a future migration plan; and
  migrating a second portion of the workload to the on-demand infrastructure based on the policy associated with the workload while including the future migration plan with the second portion, the future migration plan specifying a timing for when the second portion is to be migrated back to the dedicated infrastructure from the on-demand infrastructure and causes the on-demand infrastructure to migrate the second portion back based on the timing, the timing being based on when the new hardware components are expected to be able to provide the increase in the quantity of the resources and the timing is different from the time limit on the on-demand infrastructure for hosting the first portion defined by the security restriction, and the second portion being different from the first portion and is selected based on one or more regulatory restrictions specified in the policy.

2. The computer-implemented method of claim 1, wherein the first set of computing devices comprises one or more private computing device deployments and the second set of computing devices comprises a public cloud.

3. The computer-implemented method of claim 1, wherein the policy specifies:
  a dedicated infrastructure available resource threshold that is compared to the resource availability estimate while making the determination; and
  the policy comprises actions to be performed when the dedicated infrastructure determines that it will not have sufficient available resources during the future period of time to perform the workload, the actions comprising:
    the increasing of the quantity of resources of the dedicated infrastructure using the new hardware components that are delivered and installed into the dedicated infrastructure,
    migrating one or more portions of the workload to the on-demand infrastructure, the one or more portions comprising the first portion and the second portion,
    notifying a second user of a limited capacity of the dedicated infrastructure,
    establishing a condition of the dedicated infrastructure triggering a returning of the one or more portions of the workload back from the on-demand infrastructure to the dedicated infrastructure, and
    notifying a third user of the returning of the one or more portions of the workload back from the on-demand infrastructure to the dedicated infrastructure.

4. The computer-implemented method of claim 3, wherein the policy further specifies:
  a cost threshold associated with the workload, the cost threshold defining a maximum acceptable cost for hosting the workload during the future period of time, a cost for hosting the workload being dependent on whether the workload is hosted by the dedicated infrastructure or the on-demand infrastructure.

5. The computer-implemented method of claim 3, wherein the policy further specifies:
  a relative ranking of the workload with respect to other ones of the workloads, the relative ranking indicating whether the workload or whether another workload is preferred for hosting by the on-demand infrastructure.

6. The computer-implemented method of claim 3, wherein:
  the time limit defined in the security restriction being one limit from a group of limits consisting of: the time limit, a hardware requirement of the on-demand infrastructure that must be met for the workload to be hosted by the on-demand infrastructure, and a software requirement of the on-demand infrastructure that must be met for the workload to be hosted by the on-demand infrastructure.

7. The computer-implemented method of claim 1, wherein the policy is obtained by:
  presenting a policy creation interface to an administrator;
  receiving, via the policy creation interface, input from the administrator; and
  storing a new policy in a policy repository based on the input from the administrator, the new policy being associated with a type of the workload.

8. The computer-implemented method of claim 7, wherein the policy is further obtained by:
  identifying a type of the workload specified by the workload performance request;
  matching the type of the workload specified by the workload performance request to the policy based on an association to the type of the workload; and
  reading the policy from the policy repository.

9. The computer-implemented method of claim 7, wherein the policy is further obtained by:
  based on the input, identifying a policy conflict with another policy; and
  generating the new policy based on the input and the policy conflict.

10. The computer-implemented method of claim 1, wherein obtaining the resource availability estimate for the dedicated infrastructure during the future period of time comprises:
  monitoring, during a second period of time previous to the future period of time, use of computational resources of the dedicated infrastructure to establish an available computing resources over time trend for the dedicated infrastructure;
  generating, based on the available computing resources over time trend, an inference model for the dedicated infrastructure; and
  generating the resource availability estimate using the inference model.

11. The computer-implemented method of claim 10, wherein the inference model is obtained by fitting a curve to the available computing resources over time trend, the inference model predicting future processing resources of the dedicated infrastructure available for performing the workloads during the future period of time.

12. The computer-implemented method of claim 11, wherein the inference model is further obtained by fitting a second curve to a portion of the available computing resources over time trend associated with storage resources of the dedicated infrastructure, the inference model also predicting future storage resources of the dedicated infrastructure available for performing the workloads during the future period of time, the resource availability estimate specifying both the future processing resources and the storage resources of the dedicated infrastructure available for performing the workloads during the future period of time.

13. The computer-implemented method of claim 12, wherein making the determination comprises:

identifying a quantity of processing resources for performing the workloads;
identifying a quantity of storage resources for performing the workloads;
comparing the quantity of processing resources identified to the processing resources specified by the resource availability estimate to obtain a first indicator;
comparing the quantity of storage resources identified to the storage resources specified by the resource availability estimate to obtain a second indicator; and
using the first indicator and the second indicator in the determination.

14. The computer-implemented method of claim 10, wherein the use of computational resources of the dedicated infrastructure is monitored by, during the second period of time:
sampling resources consumption for performance of a subset of the workloads to obtain workload samples;
extrapolating the workload samples to obtain an estimate of resource consumption for performance of the workloads to obtain a consumption estimate for the second period of time; and
calculating the available computing resources over time trend using the consumption estimate.

15. The computer-implemented method of claim 10, wherein the inference model is obtained by training a machine learning model using historical computing resource availabilities of the dedicated infrastructure and historical new workload instantiations in the infrastructure.

16. A non-transitory machine-readable medium having instructions stored therein, which when executed by a processor, cause the processor to perform operations for managing infrastructure comprising dedicated infrastructure and on-demand infrastructure, the operations comprising:
obtaining, with an interface presented to a user, a workload performance request for a workload of workloads to be performed during a future period of time;
obtaining a policy associated with the workload;
obtaining a resource availability estimate for the dedicated infrastructure during the future period of time;
making a determination, based on the resource availability estimate and the policy, that the dedicated infrastructure will not have sufficient available resources during the future period of time to perform the workload, the dedicated infrastructure comprising a first set of computing devices and the on-demand infrastructure comprising a second set of computing devices different from the first set of computing devices;
in response to the determination:
transmitting one or more requisitioning requests for new hardware components to be physically delivered to the dedicated infrastructure for manual installation into the dedicated infrastructure upon delivery, the new hardware components not being taken from the second set of computing devices and being newly deployed for a first time installment into the dedicated infrastructure, the one or more requisitioning requests being based on the policy, and the policy specifies an amount of the new hardware components that can be obtained over a single period of time using a single one of the one or more requisitioning requests;
increasing a quantity of resources of the dedicated infrastructure using the new hardware components that are actually manually installed into the dedicated infrastructure; and
migrating a first portion of the workload based on a security restriction on the workload specified in the policy, the security restriction defining a time limit on the on-demand infrastructure for hosting the first portion; and
after transmitting the one or more requisitioning requests and before the new hardware components are actually manually installed into the dedicated infrastructure:
generating a future migration plan; and
migrating a second portion of the workload to the on-demand infrastructure based on the policy associated with the workload while including the future migration plan with the second portion, the future migration plan specifying a timing for when the second portion is to be migrated back to the dedicated infrastructure from the on-demand infrastructure and causes the on-demand infrastructure to migrate the second portion back based on the timing, the timing being based on when the new hardware components are expected to be able to provide the increase in the quantity of the resources and the timing is different from the time limit on the on-demand infrastructure for hosting the first portion defined by the security restriction, and the second portion being different from the first portion and is selected based on one or more regulatory restrictions specified in the policy.

17. The non-transitory machine-readable medium of claim 16, wherein the first set of computing devices comprises one or more private computing device deployments and the second set of computing devices comprises a public cloud.

18. The non-transitory machine-readable medium of claim 16, wherein the policy specifies:
a dedicated infrastructure available resource threshold that is compared to the resource availability estimate while making the determination; and
the policy comprises actions to be performed when the dedicated infrastructure determines that it will not have sufficient available resources during the future period of time to perform the workload, the actions comprising:
the increasing of the quantity of resources of the dedicated infrastructure using the new hardware components that are delivered and installed into the dedicated infrastructure,
migrating one or more portions of the workload to the on-demand infrastructure, the one or more portions comprising the first portion and the second portion,
notifying a second user of a limited capacity of the dedicated infrastructure,
establishing a condition of the dedicated infrastructure triggering a returning of the one or more portions of the workload back from the on-demand infrastructure to the dedicated infrastructure, and
notifying a third user of the returning of the one or more portions of the workload back from the on-demand infrastructure to the dedicated infrastructure.

19. An infrastructure manager, comprising:
a processor, and
a memory coupled to the processor to store instructions, which when executed by the processor, cause the processor to perform operations for managing infrastructure comprising dedicated infrastructure and on-demand infrastructure, the operations comprising:

obtaining, with an interface presented to a user, a workload performance request for a workload of workloads to be performed during a future period of time;

obtaining a policy associated with the workload;

obtaining a resource availability estimate for the dedicated infrastructure during the future period of time;

making a determination, based on the resource availability estimate and the policy, that the dedicated infrastructure will not have sufficient available resources during the future period of time to perform the workload, the dedicated infrastructure comprising a first set of computing devices and the on-demand infrastructure comprising a second set of computing devices different from the first set of computing devices;

in response to the determination:

transmitting one or more requisitioning requests for new hardware components to be physically delivered to the dedicated infrastructure for manual installation into the dedicated infrastructure upon delivery, the new hardware components not being taken from the second set of computing devices and being newly deployed for a first time installment into the dedicated infrastructure, the one or more requisitioning requests being based on the policy, and the policy specifies an amount of the new hardware components that can be obtained over a single period of time using a single one of the one or more requisitioning requests;

increasing a quantity of resources of the dedicated infrastructure using the new hardware components that are actually manually installed into the dedicated infrastructure; and migrating a first portion of the workload based on a security restriction on the workload specified in the policy, the security restriction defining a time limit on the on-demand infrastructure for hosting the first portion; and after transmitting the one or more requisitioning requests and before the new hardware components are actually manually installed into the dedicated infrastructure:

generating a future migration plan; and migrating a second portion of the workload to the on-demand infrastructure based on the policy associated with the workload while including the future migration plan with the second portion, the future migration plan specifying a timing for when the second portion is to be migrated back to the dedicated infrastructure from the on-demand infrastructure and causes the on-demand infrastructure to migrate the second portion back based on the timing, the timing being based on when the new hardware components are expected to be able to provide the increase in the quantity of the resources and the timing is different from the time limit on the on-demand infrastructure for hosting the first portion defined by the security restriction, and the second portion being different from the first portion and is selected based on one or more regulatory restrictions specified in the policy.

20. The infrastructure manager of claim 19, wherein the policy specifies:

a dedicated infrastructure available resource threshold that is compared to the resource availability estimate while making the determination; and the policy comprises actions to be performed when the dedicated infrastructure determines that it will not have sufficient available resources during the future period of time to perform the workload, the actions comprising:

the increasing of the quantity of resources of the dedicated infrastructure using the new hardware components that are delivered and installed into the dedicated infrastructure, migrating one or more portions of the workload to the on-demand infrastructure, the one or more portions comprising the first portion and the second portion, notifying a second user of a limited capacity of the dedicated infrastructure, establishing a condition of the dedicated infrastructure triggering a returning of the one or more portions of the workload back from the on-demand infrastructure to the dedicated infrastructure, and notifying a third user of the returning of the one or more portions of the workload back from the on-demand infrastructure to the dedicated infrastructure.

* * * * *